(12) United States Patent
Zhu et al.

(10) Patent No.: US 8,184,621 B2
(45) Date of Patent: May 22, 2012

(54) APPARATUS, SYSTEM AND METHOD FOR SHORT MESSAGE ROUTING CONTROL

(75) Inventors: Dongming Zhu, Shenzhen (CN); Jianfeng Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 877 days.

(21) Appl. No.: 12/198,550

(22) Filed: Aug. 26, 2008

(65) Prior Publication Data

US 2009/0047967 A1 Feb. 19, 2009

Related U.S. Application Data

(63) Continuation of application No. PCT/CN2007/002532, filed on Aug. 21, 2007.

(30) Foreign Application Priority Data

Aug. 28, 2006 (CN) .......................... 2006 1 0125799

(51) Int. Cl.
 *H04L 12/66* (2006.01)
(52) U.S. Cl. ......... 370/352; 455/445; 455/466; 370/328
(58) Field of Classification Search .................. 455/445, 455/466; 370/351, 352–356, 328
See application file for complete search history.

(56) References Cited

U.S. PATENT DOCUMENTS

| 6,611,516 B1 | 8/2003 | Pirkola et al. | |
| 2005/0036457 A1 | 2/2005 | Salin | |
| 2007/0183394 A1* | 8/2007 | Khandelwal et al. | 370/352 |

FOREIGN PATENT DOCUMENTS

| CN | 1567896 | 1/2005 |
| CN | 1802022 | 7/2006 |

OTHER PUBLICATIONS

3GPP, 3GPP TR 23.806 v7.0.0, Dec. 2005, published by 3GPP.*
European Office Action regarding Application No. 07 800 752.3-1249, dated Dec. 16, 2010.
International Search Report for International Application No. PCT/CN2007/002532, dated Nov. 16, 2007, with English translation.
European Office Action regarding Application No. 07 800 752.3-1249 dated Jul. 1, 2010.
Extended European Search Report regarding Application No. 07800752.3-1249 dated Jan. 29, 2010.
First Chinese Office Action regarding Application No. 200610125799.2 dated Sep. 26, 2008. Partial translation provided by Huawei Technologies Co., Ltd.

(Continued)

*Primary Examiner* — Vladimir Magloire

(57) ABSTRACT

The present disclosure provides an apparatus, system and method for short message routing control for delivering the short message when multiple paths exist. The apparatus for short message routing control includes an short message intelligent decision query unit and a Network Domain selection entity (NeDs) connected with each other; the short message intelligent decision query unit is configure to query the NeDs for a routing decision of a short message upon receiving the short message; and the NeDs is configured to determine the routing decision of the short message according to routing decision information stored in the NeDs, and return the determined routing decision to the short message intelligent decision query unit.

21 Claims, 16 Drawing Sheets

OTHER PUBLICATIONS

Written Opinion regarding International Application No. PCT/CN2007/002532 dated Nov. 29, 2007. Translation provided by Huawei Technologies Co., Ltd.

SMSIP Architecture vs. Generic Domain Selection Function. 3GPP TSG SA WG2 Architecture—S2#54; S2-062823. Aug. 28-Sep. 1, 2006.

Linkage between SMS over IP and MT SMSC. 3GPP TSG SA WG2 Architecture—S2#54. S2-063141. Aug. 26-Sep. 1, 2006.

3rd Generation Partnership Project, "Technical Specification Group Services and System Aspects; Support of SMS and MMS over generic 3GPP IP access", Stage 2 (Release 7) 3GPP TS 23.204 V1.1.0 (Feb. 2006),15 pages total.

* cited by examiner

APPARATUS, SYSTEM AND METHOD FOR SHORT MESSAGE ROUTING CONTROL

CROSS-REFERENCE TO RELATED APPLICATIONS

This application is a continuation of International Application No. PCT/CN2007/002532, filed Aug. 21, 2007. This application claims the benefit and priority of Chinese Application No. 200610125799.2, filed Aug. 28, 2006. The entire disclosures of each of the above applications are incorporated herein by reference.

FIELD

The present disclosure relates to the field of communications, and particularly to an apparatus, system and method for short message routing control.

BACKGROUND

This section provides background information related to the present disclosure which is not necessarily prior art.

Short Message Service (SMS) provides a method for transferring a message of certain size between terminals or between a terminal and a network, with a successful application in a cellular network of a CS domain. A network entity called as short message center is introduced in the implementation of the SMS, and thus short message forwarding, storing and deferred delivery and other value added services may be implemented. The GSM/UMTS Public Land Mobile Network (PLMN) is required to support a short message forwarding function between a short message center and terminals.

An IP multimedia subsystem (IMS) is a subsystem added in the 3GPP R5 on the basis of the existing PS domain. The IMS employs the PS domain as a bearer channel for the transmission of its upper level control signaling and media data, adopts a Session Initiation Protocol (SIP) as an IMS service control protocol, and provides abundant multimedia services for subscribers by separating the service control from the bearer control, and by utilizing the characteristics of the SIP, i.e., simple, extensible and convenient for a media combination. A network integrated solution of IMS allows operators to provide fixed users and mobile users with the same service based on a unified core network. For a network structure with the core networks of fixed network and mobile network coexisting, not only the complexity of the network structure may be reduced but also the cost of operation and maintenance may also be cut down.

For the network structure for implementing SMS, there is weak control on a short message MT, and there are defects in filtering the junk short message, and implementing lawful intercept and some value-added short message services. Therefore, a network structure of MT short message center is introduced in the 3GPP specification. In view of the successful application of the SMS in the existing cellular system, it is taken into account to expand the SMS to be employed in non-cellular IP connection networks in the 3GPP specification. It is defined in the TISPAN that an AS in the IMS stores and forwards a short message and handles a supplementary service of the short message. And at the 3GPP conference, how to distinguish a short message procedure in the IMS from an inter-domain short message procedure began to be taken into consideration. Therefore, one of the problems to be solved by the 3GPP is to consider how to integrate the network structure of the MT short message center and the network structure for short message interworking and to consider that an AS in the IMS stores and forwards a short message and handles a supplementary service of the short message so as to form a valuable product.

Prior art I: The network structure for short message interworking as defined by the 3GPP is shown in FIG. 1, and the function of each network entity is described as follows.

SMSC: Short Message Service Center, is configured to relay, store and forward a short message between a base station and a Short Message Entity (SME); a protocol between Mobile Equipment (ME) and SMSC can transmit the short message from or to ME. The protocol is Short Message Transmission Protocol (SMTP).

SMCIWMSC/GMSC: SMS-Gateway MSC, i.e., SMS gateway, is configured to receive a short message sent by the SMSC, and query the HLR for the routing information, and transmitting the short message to a switching center of a base station where a receiver resides.

IP-SM-GW: IP Short Message Gateway, is configure to provide a interworking function between the UE and GSM/UMTS network to transmit a short message. An AS in the IMS may serve as an IP-SM-GW entity.

HLR/HSS: Home Location Register/Home Subscriber Server, is configured to provide the SMS service with a routing function. In the Mobile-Terminated (MT) procedure, the GMSC sends a routing request message to the HLR/HSS; if the UE previously registered the address of the IP-SM-GW, the E.164 address of the IP-SM-GW contained in a routing response message is returned to the GMSC.

In view of the above network structure for short message interworking as already defined by the 3GPP, the procedure for registering an SMS as shown in FIG. 2 includes the following:

The UE initiates a normal registration/re-registration procedure.

The S-CSCF checks a triggering rule, finds out the address of the IP-SM-GW, and triggers a third party registration procedure.

The IP-SM-GW stores the address of the S-CSCF.

The IP-SM-GW initiates a registration procedure to the HSS/HLR.

The HSS/HLR stores the E.164 address information of the IP-SM-GW, and returns a response.

The IP-SM-GW returns a response to the S-CSCF.

The S-CSCF returns a response to the UE.

In view of the above network structure for short message interworking as already defined by the 3GPP, its short message MT procedure (Mobile-Terminated short message procedure) as shown in FIG. 3 includes the following:

The UE registers at the S-CSCF via an IMS registration procedure with the above short message registration procedure performed.

The SM-SC forwards an SMS message to the SMS-GMSC.

The SMS-GMSC sends a routing request to the HLR/HSS. The routing request contains an indicator indicating that the SMS-GMSC supports IP message routing.

The HSS/HLR returns a registered E.164 address of the IP-Message-GW to the UE;

The SMS-GMSC sends the SMS message to the IP-Message-GW. The SMS message contains the MSISDN of the UE.

Convert the MSISDN into a TelUrl, and find the corresponding S-CSCF address according to the TelUrl.

The IP-Message-GW sends the SMS message to the S-CSCF.

The S-CSCF forwards the SIP MESSAGE to the UE.

The UE returns a 200 OK response to the S-CSCF.

The S-CSCF sends a 200 OK to the IP-Message-GW.

The UE sends a delivery report to the S-CSCF via the SIP MESSAGE.

The S-CSCF forwards the SIP MESSAGE to the IP-Message-GW according to a filtering rule.

The IP-Message-GW sends the delivery report to the SMS-GMSC.

The SMS-GMSC sends the delivery report to the HLR/HSS.

The SMS-GMSC sends the delivery report to the SM-SC.

The IP-Message-GW gives the S-CSCF an acknowledge message via a 200 OK.

The S-CSCF gives the UE an acknowledge message via a 200 OK.

In prior art I, only the state of a user in the IMS and the relation between the user and an S-CSCF are registered on the IP-SM-GW without the case that the user registers on both CS domain and IMS taken into consideration. Therefore, when a user registers on both CS domain and IMS, it is impossible to determine to route a short message to whether the CS domain or the IMS according to conditions such as the state, capability and preference of the user. And due to the lack of a mechanism for recording a routing control method in the case of multiple IP connections in the IMS, an intelligent control cannot be exerted on the further routing of a short message after the short message reaches the IMS. Due to the lack of the short message center at the MT, an enhanced control can not be exerted on the short message at the MT.

Prior art II: a network structure with an MT short message center introduced is shown in FIG. 4.

For the procedure for registering an SMS in the IMS, refer to prior art I.

The procedure for sending a short message includes the following:

I. A user in the CS domain sends a short message to a user having a single subscription in the IMS:

An UE in the CS domain sends a short message via an MSC.

The MSC parses a short message center address in the short message, and sends the short message to an MO-SMSC via an SMS-IWMSC upon making a route analysis.

The MO-SMSC queries an HSS/HLR for an MT-SMSC, and sends the short message to the MT-SMSC.

The MT-SMSC sends the short message to an SMS-GMSC.

The SMS-GMSC queries the HSS/HLR for the routing information of the called user.

The HSS/HLR returns the address of the IP-SM-GW.

The SMS-GMSC sends the short message to the IP-SM-GW.

The IP-SM-GW sends the short message to the S-CSCF recorded when the third party registers.

The S-CSCF routes the short message to the UE.

II. A user in the IMS sends a short message to a user having a single subscription in the CS domain:

A UE in the IMS sends the short message to the IP-SM-GW via the S-CSCF.

The IP-SM-GW parses the address a short message center in the short message, and sends the short message to the MO-SMSC via the SMS-IWMSC upon making a route analysis.

The MO-SMSC queries the HSS/HLR for the MT-SMSC, and sends the short message to the MT-SMSC.

The MT-SMSC sends the short message to the SMS-GMSC.

The SMS-GMSC queries the HSS/HLR for the routing information of the called user.

The HSS/HLR returns the number of the MSC where the called user currently resides.

The SMS-GMSC sends the short message to the MSC where the called resides.

The MSC sends the short message to the called user by paging.

III. A user in the CS domain sends a short message to a user having a single subscription in the CS domain:

A UE in the CS domain sends a short message via an MSC.

The MSC parses the address of a short message center in the short message, and sends the address the short message center to an MO-SMSC via an SMS-IWMSC upon making a route analysis.

The MO-SMSC queries an HSS/HLR for an MT-SMSC, and sends the short message to the MT-SMSC.

The MT-SMSC sends the short message to an SMS-GMSC.

The SMS-GMSC queries the HSS/HLR for the routing information of the called user.

The HSS/HLR returns the number of the MSC where the called user currently resides.

The SMS-GMSC sends the short message to the MSC.

The MSC sends the short message to the called user by paging.

In prior art II, although the control on the MT is enhanced by introducing the short message center at the MT, that the user subscribes to both CS domain and IMS is still not taken into consideration. Therefore, if the user subscribes to both CS domain and IMS, it is impossible to determine to route the short message to whether the CS domain or the IMS. Due to the lack of a high level decision mechanism, the routing capability of the short message is weak, and the intelligent routing control cannot be exerted according to the user's preference, operator's strategy, user's registration state, etc.

Prior art III: A schematic drawing of network architecture illustrating a short message routing method in the IMS as defined by the TISPAN is shown in FIG. 5.

In view of a network architecture based on a short message routing method in the IMS as defined by the TISPAN, a short message routing procedure includes the following:

The UE in the IMS sends a short message to the S-CSCF.

The S-CSCF, according to a filtering rule, triggers the AS-SMS to perform the service control of a calling user and a necessary redirection (when the address of a called user is encapsulated in the short message) without storing the short message, and the AS-SMS, in turn, sends the short message to the S-CSCF. If only the requirement in the TISPAN is taken into consideration, this step is optional.

The S-CSCF parses the DNS, queries the address of the I-CSCF, and sends the short message to the I-CSCF.

The I-CSCF queries the UPSF (i.e., HSS/HLR) to obtain the address of the S-CSCF where the called user resides, and forwards the short message to the S-CSCF where the called user resides.

The S-CSCF where the called user resides sends the short message to the AS at the MT according to a triggering rule.

The AS at the MT returns the short message to the S-CSCF at the MT upon performing a supplementary service handling.

The S-CSCF at the MT routes the short message to the UE.

In the TISPAN, only the implementation procedure of the short message in the IMS is taken into consideration, but the short message interworking with the CS domain and the inter-domain route if the user subscribes to both CS domain and IMS are not taken into consideration. Also lacked is the capability of enhancing control on the MT.

The inventor found in designing the disclosure that the prior art cannot satisfy the demand for implementing the enhanced routing control so as to deliver the short message when multiple paths exist.

SUMMARY

This section provides a general summary of the disclosure, and is not a comprehensive disclosure of its full scope or all of its features.

Various embodiments of the present disclosure provide an apparatus, system and method for short message routing control to satisfy the demand for implementing the enhanced routing control so as to deliver the short message when multiple paths exist.

The apparatus for short message routing control includes an short message intelligent decision query unit and a routing decision control entity, NeDs, connected with each other; the short message intelligent decision query unit is configure to query the NeDs for a routing decision of a short message upon receiving the short message; and the NeDs is configured to determine the routing decision of the short message according to routing decision information stored in the NeDs, and return the determined routing decision to the short message intelligent decision query unit.

The system for short message routing control includes: a short message intelligent decision query unit, configure to query for a routing decision of a short message upon receiving the short message; and a Network Domain selection entity (NeDs), configured to determine the routing decision of the short message according to routing decision information stored in the NeDs upon receiving the query from the short message intelligent decision query unit, and return the determined routing decision to the short message intelligent decision query unit.

The method for short message routing control includes: A. initiating, by a short message intelligent decision query unit, a routing decision query request to a Network Domain selection entity (NeDs) upon receiving a short message; B. receiving, by the short message intelligent decision query unit, a routing decision of the short message determined by the NeDs according to the stored routing decision information; and C. performing, by the short message intelligent decision query unit, the subsequent routing control according to the routing decision received.

In the various embodiments, entities such as NeDs, short message intelligent decision query unit and MT (called side) short message center are introduced to the existing network architecture not only to well enhance the control on the MT but also to well solve the problem of routing and addressing of a short message interworking between the CS domain and the IMS in each scenario.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In accordance with various embodiments, new requirements will be met with a minimal change in the existing network by taking each current short message interworking network architecture into full consideration. Information used for routing a short message, such as user's preference, terminal's registration state and operator's strategy configuration, may be obtained by a network. The present disclosure can meet a requirement for short message interworking between a CS domain and an IMS, a requirement for short message implementation in the IMS, a requirement for enhancing the control on the MT, and a requirement for implementing the enhanced routing control so as to deliver the short message when multiple paths exist for a user subscribing to a single domain. In addition, if a user subscribes to CS domain and IMS, the present disclosure can also meet a requirement for inter-domain routing and a requirement for implementing the enhanced routing control so as to deliver the short message when multiple paths exist.

Figure 1:
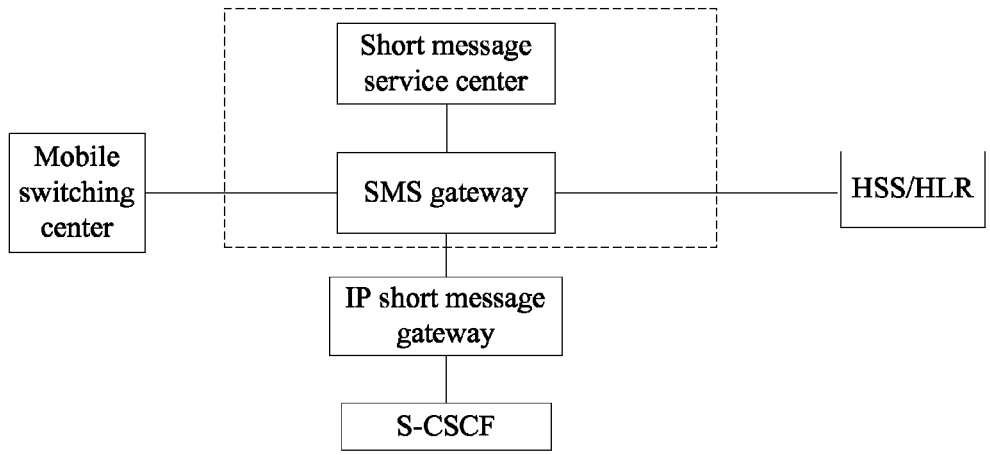
FIG. 1 is a schematic drawing illustrating network architecture for short message interworking as defined by the 3GPP.
Figure 2:
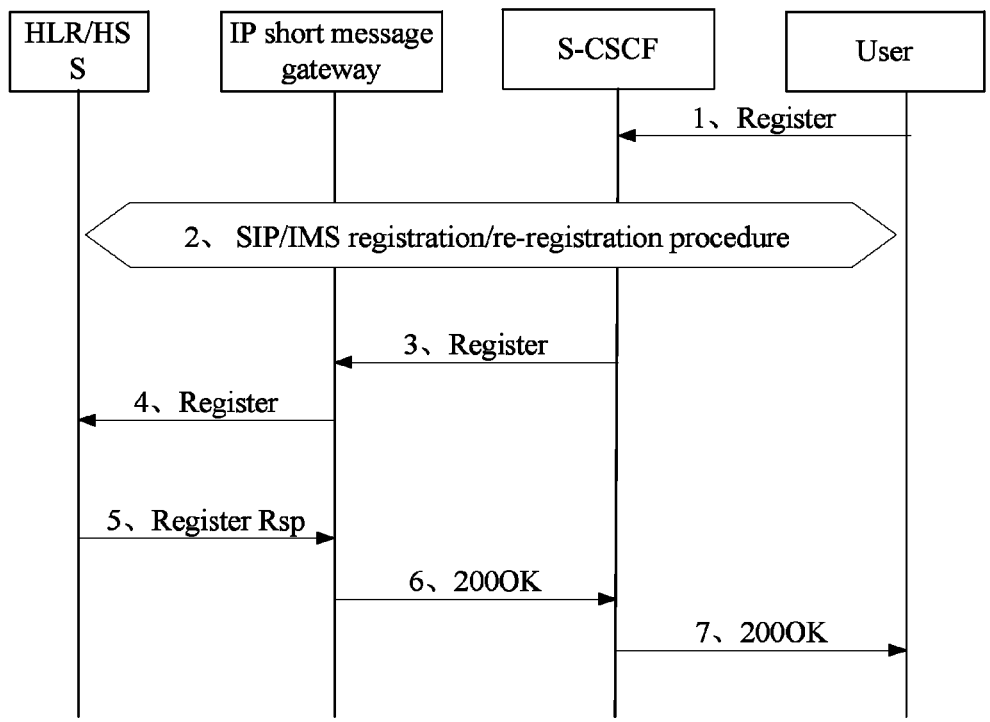
FIG. 2 is a flowchart illustrating a registration process based on a short message interworking network structure defined by the 3GPP definition.
Figure 3:
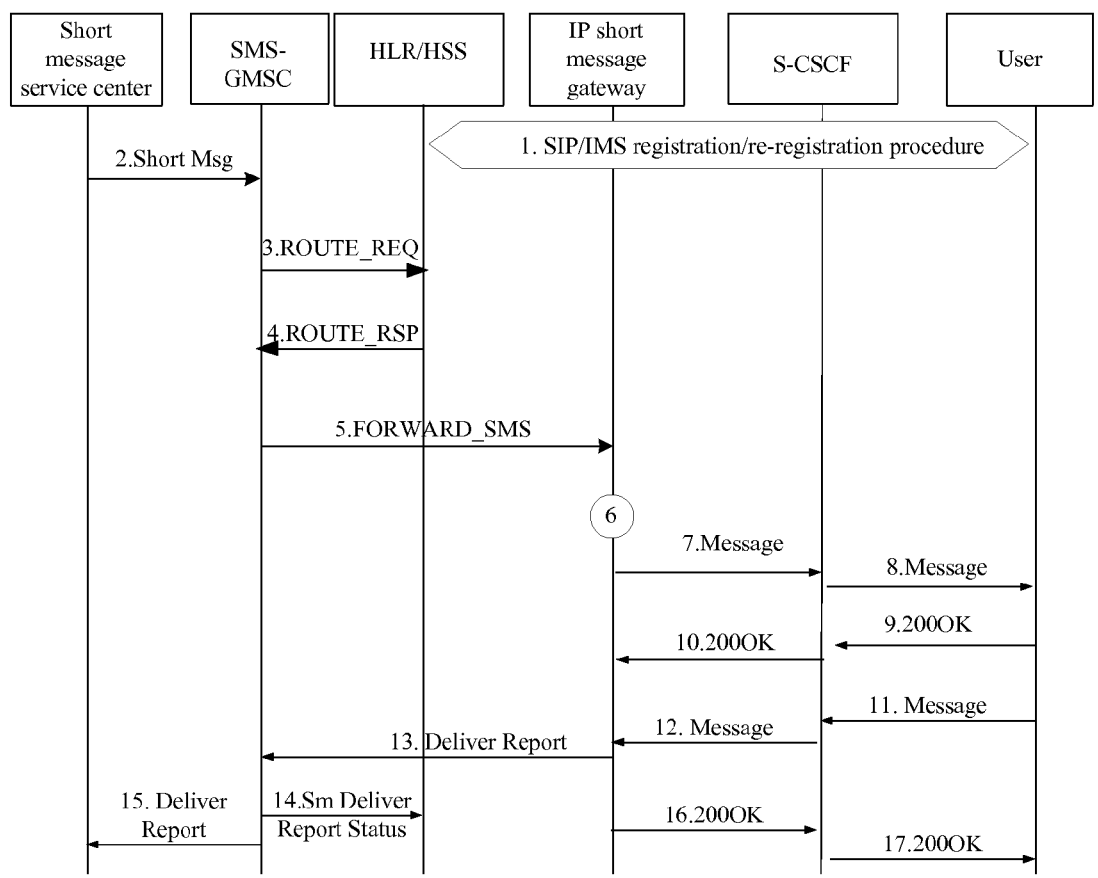
FIG. 3 is a flowchart illustrating an MT short message process based on a short message interworking network structure defined by the 3GPP definition.
Figure 4:
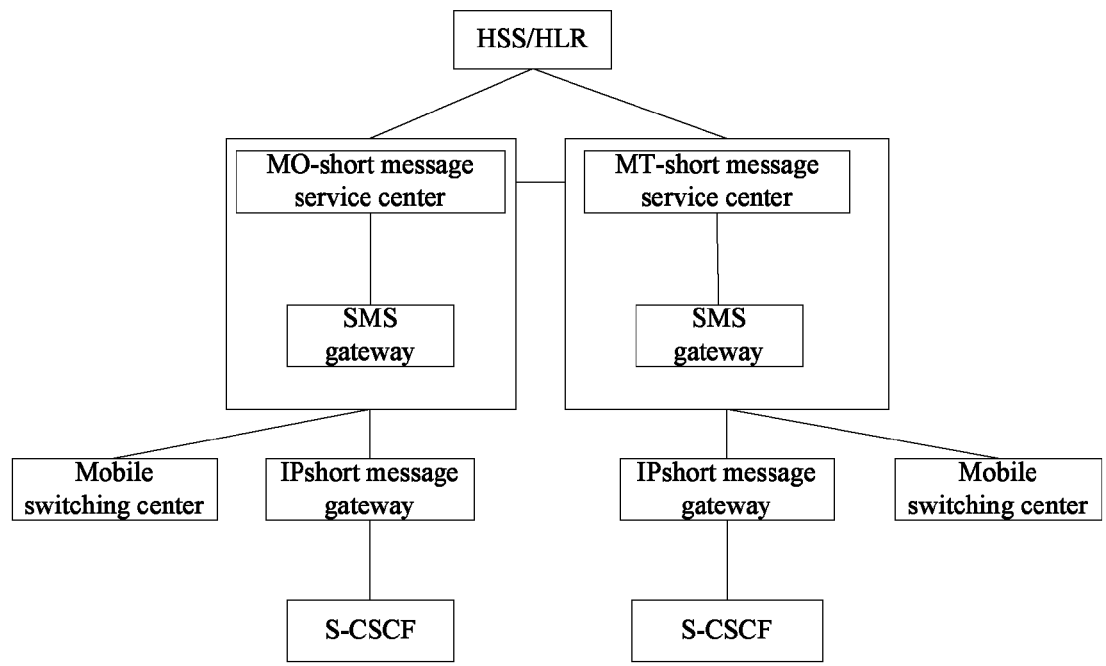
FIG. 4 is a schematic drawing illustrating network architecture with an MT short message center introduced.
Figure 5:
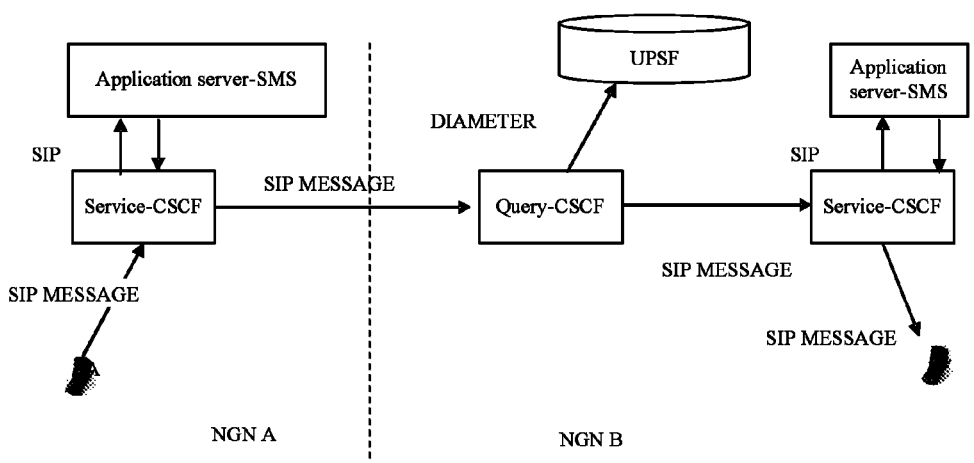
FIG. 5 is a schematic illustrating a network structure in a short message routing mode in an IMS as defined by the TISPAN.
Figure 6:
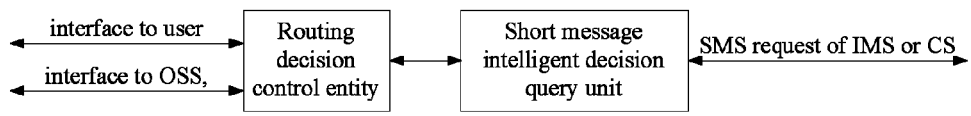
FIG. 6 is a schematic drawing illustrating a structure in accordance with an apparatus in accordance with an embodiment.

As shown in FIG. 6, an apparatus for short message routing control is provided in accordance with various embodiments. The apparatus includes: a short message intelligent decision query unit and a routing decision control entity (NeDs) both connected with each other. Specifically, the NeDs has an interface connected to a user, and an interface connected to the OSS. The short message intelligent decision query unit may send and receive a short message service request of the IMS or CS.

The short message intelligent decision query unit is configured to query the NeDs for a routing decision of a short message upon receiving the short message.

The NeDs is configured to determine the routing decision of the short message according to the stored routing decision information, and return the determined routing decision to the short message intelligent decision query unit.

A system for short message routing control is also provided in accordance with an embodiment by applying the above apparatus. The system may include: a Home Subscription Server HSS/HLR, an MO short message center, an MT short message center, and a short message intelligent decision query unit and an NeDs connected with each other.

According to the difference of locations of the short message intelligent decision query unit and the NeDs, the system is implemented in the following three modes.

Figure 7:
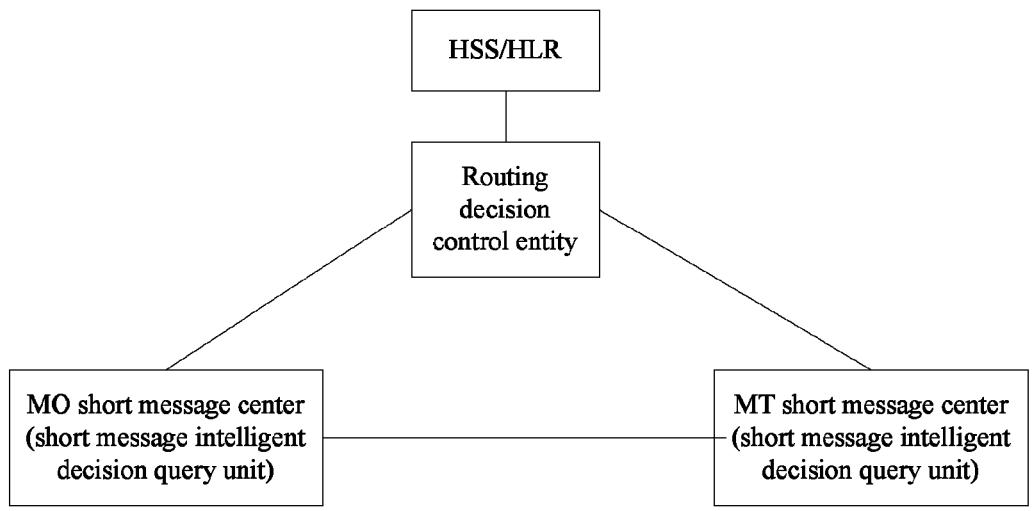
FIG. 7 is a schematic drawing illustrating a structure of mode I for implementing a system in accordance with an embodiment.

Mode I of system implementation: as shown in FIG. 7, an NeDs is connected to an HSS/HLR which communicates with other network entities via the NeDs (The NeDs and the HSS/HLR are integrated as one physical entity or deployed separately), and configured to intercept signaling so as to make a routing decision when an MO short message center or MT short message center acquires the MT routing information from the HSS/HLR.

The short message intelligent decision query unit is embodied in the MO short message center (i.e., the MO short message center is taken as the short message intelligent decision query unit), configured to query for the inter-domain routing decision so that the MO short message center may perform the inter-domain routing decision function and thus route the short message to the selected domain.

The short message intelligent decision query unit is also embodied in the MO short message center (i.e., the MO short message center is taken as the short message intelligent decision query unit), configured to query for the enhanced routing control decision so that the MT short message center may perform an enhanced routing decision function and thus route the short message to the path selected from multiple paths.

Figure 8:
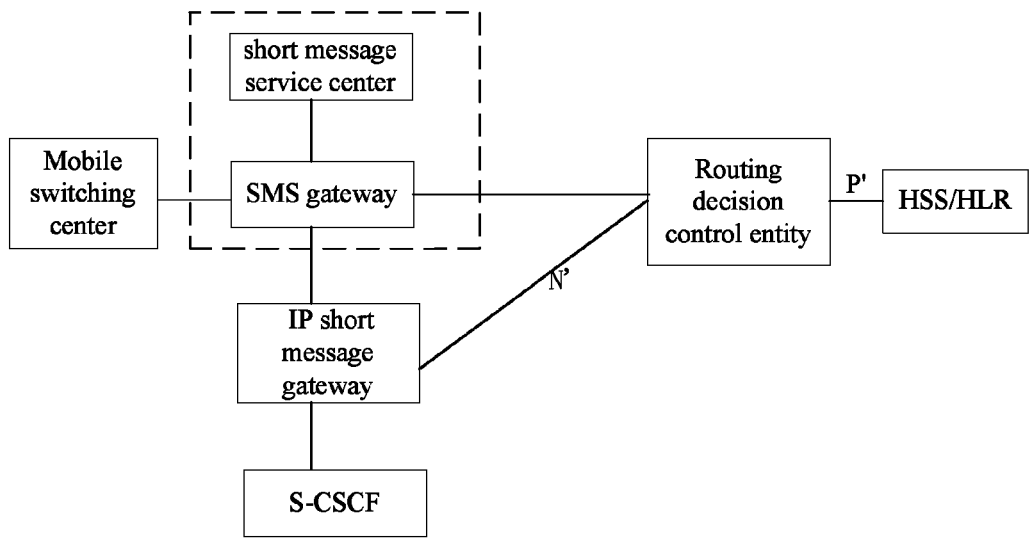
FIG. 8 is a schematic drawing illustrating a structure in accordance with system embodiment I.

System embodiment 1: corresponding to the above system implementation mode I, system embodiment 1 is provided below as shown in FIG. 8.

The route of a short message needs to be distinguished in the CS domain and IMS. In the CS domain, the SMSC may function as a Mobile Originating (calling side) Short Message Center (MO-SMSC) and Mobile Terminating (called side) Short Message Center (MT-SMSC). The definition of MO or MT is determined according to the locations of the calling user and the called user in the network in a short message procedure. In the IMS, the function of an original IP-SM-GW is enhanced, that is, an SMS-AS unit is added to the IP-SM-GW, and thus the IP-SM-GW is taken as an SMSC in the IMS. The enhanced IP-SM-GW can not only be taken as an interworking short message gateway between the CS domain and IMS, but also as a short message center in the IMS to store and forward the short message, and handle a supplementary service. The location and function of the IP-SM-GW in the IMS is similar to that of the SMSC in the CS domain, and the IP-SM-GW at the MO has also to be distinguished from the IP-SM-GW at the MT. Meanwhile, a new NeDs is also added. The NeDs is connected to the HSS/HLR which communicates with other network entities via the NeDs, and configured to intercept signaling from the MO short message center and the MT short message center to the HSS/HLR, and perform the intelligent routing control function of the short message according to the stored registration state of UE, operator's strategy, and user's preference.

The interface capability is also expanded for the existing network entity in this embodiment, including:

setting an interface between an NeDs and a short message gateway SMSC-IWMSC/GMSC connected with an SMSC in the CS domain, configured to support the SMSC to acquire routing decision information from the NeDs via the SMSC-IWMSC/GMSC;

setting an interface (N' interface) between the NeDs and an IP-SM-GW, configured to support the IP-SM-GW to acquire the routing decision information from the NeDs;

setting an interface (P' interface) between the NeDs and an HSS/HLR, configured to forward signaling from the MO/MT short message center to the HSS/HLR.

Figure 9:
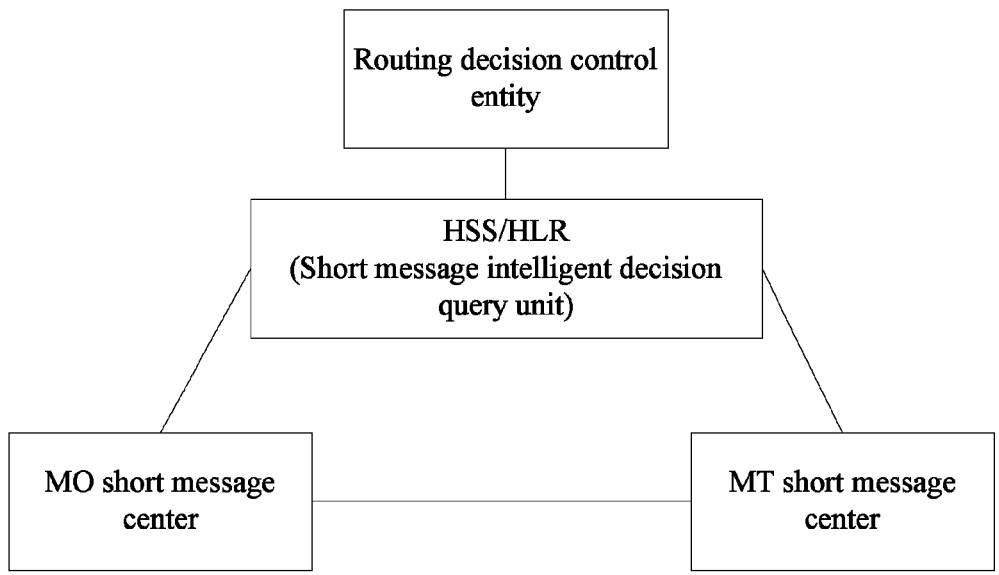
FIG. 9 is a schematic drawing illustrating a structure of mode II for implementing a system in accordance with an embodiment.

Mode II of system implementation: as shown in FIG. 9, the short message intelligent decision query unit is embodied in the HSS/HLR (i.e., HSS/HLR functions as the short message intelligent decision query unit), used for the HSS/HLR to query the NeDs for the routing decision when the MO short message center or the MT short message center acquires the MT routing information from the HSS/HLR.

The NeDs is connected to the HSS/HLR, communicates with other network entities via the HSS/HLR (The NeDs and the HSS/HLR is deployed in one physical entity or deployed separately), and is configured to query for the routing decision for the HSS/HLR.

Figure 10:
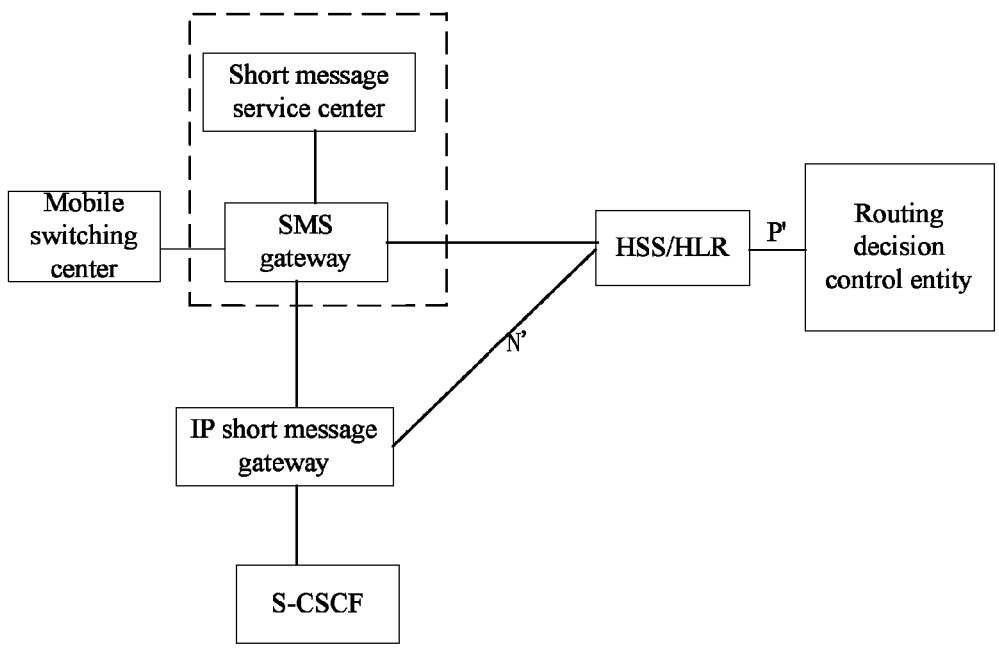
FIG. 10 is a schematic drawing illustrating a structure in accordance with system embodiment II.

System embodiment II: corresponding to the above mode II of system implementation, the system embodiment II is provided below as shown in FIG. 10.

The SMSC in the CS domain is taken as the MO short message center or the MT short message center. In the IMS, the interworking gateway IP-SM-GW to which a SMS-AS unit is added to enables the IP-SM-GW to function as the MO short message center or the MT short message center in the IMS, and as an interworking gateway (Similar to system embodiment 1).

In addition to the original functions, the HSS/HLR has an internal or external interface with a capability of reporting the user's current registration state to the NeDs. The HSS/HLR requests a routing decision from the NeDs via the internal or external interface upon receiving the short message routing query message and determining that the called user subscribes to both CS domain and IMS, selects the MT routing information from the stored address information of the MT short message center according to the routing decision returned by the NeDs, and returns the MT routing information. The HSS/HLR directly returns the MT routing information upon receiving the short message routing query message and determining that the called user subscribes to a single domain.

The NeDs is connected to the HSS/HLR, communicates with other network entities via the HSS/HLR, and is configured to determine the routing decision of the short message according to the stored registration state of UE, operator's strategy, and user's preference. If the HSS/HLR does not have a function for determining the user registration state (subscribing to a single domain or both two domains), but the HSS/HLR can report the user's current registration state to the NeDs, the HSS/HLR directly forwards the short message route query message to the NeDs, and requests for a routing decision upon receiving the short message route query message. The NeDs returns the routing decision to the HSS/HLR upon determining the called user's registration state. The HSS/HLR selects the MT routing information from the stored address information of the MT short message center according to the routing decision returned by the NeDs, and returns the MT routing information.

The interface capability is also expanded for the existing network entity in this embodiment, including:

The SMSC-IWMSC/GMSC in FIG. 10 can acquire the routing decision information from the HSS/HLR.

There is an interface (N' interface) between the IP-SM-GW and the HSS/HLR, configured to support the IP-SM-GW to acquire the MT routing information from the HSS/HLR.

There is an interface (P' interface) between the HSS/HLR and the NeDs, configured to support the HSS/HLR to acquire the routing decision information from the NeDs and report the user's registration sate.

Figure 11:
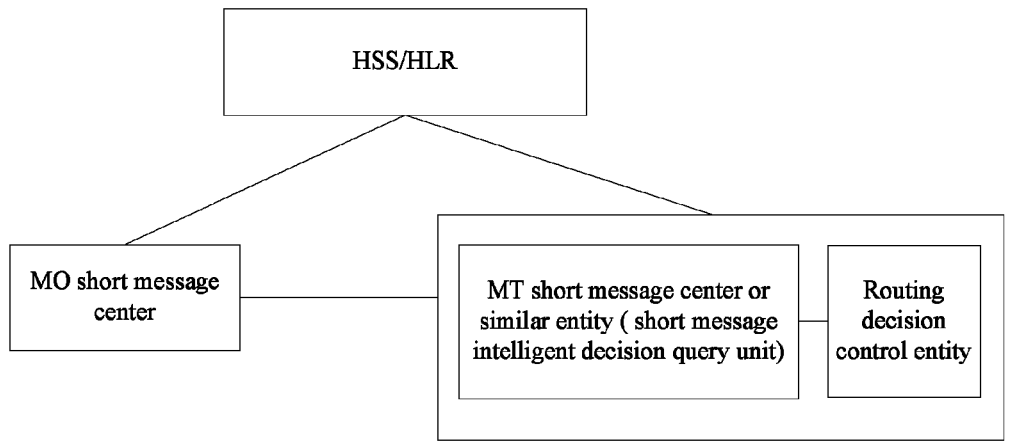
FIG. 11 is a schematic drawing illustrating a structure of mode III for implementing a system in accordance with an embodiment.

Mode III of system implementation: as shown in FIG. 11, the MT short message center is taken as the intelligent routing decision query unit (the short message intelligent decision query unit is embodied in the MT short message center) to query the NeDs. The NeDs is located in the MT short message center or the similar network control entity, the interface between the NeDs and MT short message center or entity is an internal interface, and the intelligent control point is implemented at the MT.

Figure 12:
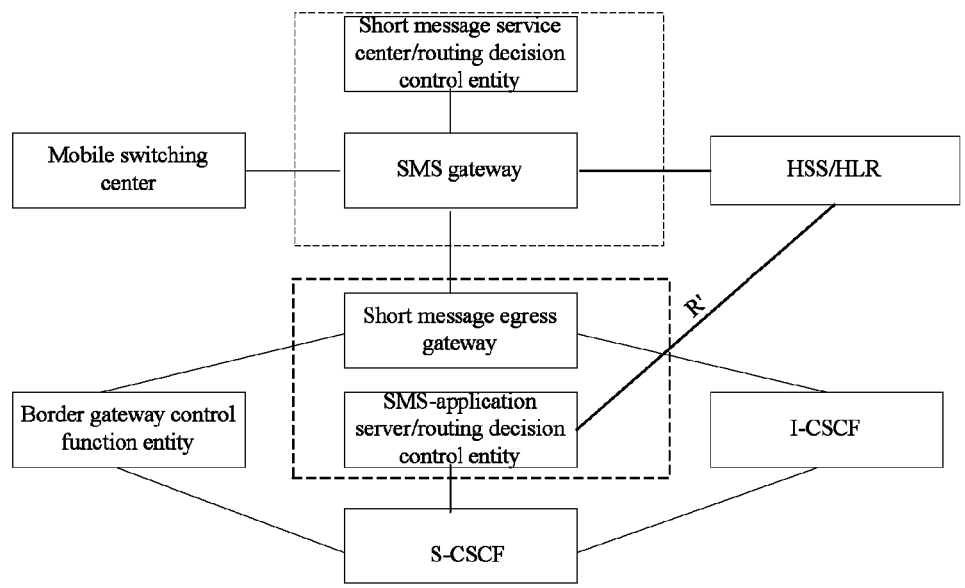
FIG. 12 is a schematic drawing illustrating a structure in accordance with system embodiment III.

System embodiment III: corresponding to the above mode III of system implementation, the system embodiment III is provided below as shown in FIG. 12.

In the CS domain, the SMSC is taken as the MT short message center, and an short message intelligent decision query unit and NeDs are added to the SMSC, i.e., for the SMSC/NeDs, a routing decision function of the short message is added to the original message storing and forwarding function.

In the IMS, a short message application server SMS-AS is taken as the MT short message center, and a short message intelligent decision query unit and NeDs are added to the SMS-AS. The SMS-AS/NeDs has the functions of the short message gateway and NeDs (i.e., the function of the SMS-AS/NeDs is equivalent to that of IP-SM-GW plus NeDs), can convert the format of message, is capable of acquiring the address of the MT short message center from the HSS/HLR, and can also determine the routing decision of the short message according to the stored registration state of UE, operator's strategy, and user's preference.

The HSS/HLR in FIG. 12 can report the user's current registration state. The HSS/HLR selects an MT short message center according to the preset configuration upon receiving the short message routing query message sent from the MO. The routing decision is made by the selected MT short message center. Then the selected MT short message center instructs the HSS/HLR to return the MT routing information according to the determined routing decision, or directly makes a route selection according to the routing information stored in the MT short message center. On the HSS/HLR, the address in the MT short message may be statically configured so that the short message may be routed to this short message center for the subsequent routing decision. Instead of statically configuring the address in the MT short message on the HSS/HLR, the subsequent routing decision is also made by selecting the nearby MT short message center in the same domain with the MO of the short message.

The short message egress gateway SMS-MGCF in FIG. 12 is configured to interpret the short message between the CS domain and the IMS, and can also be embodied in the MGCF function entity.

In practice, the above SMS-MGCF and the SMS-AS/NeDs may be deployed in one physical entity, and may be added to the IP-SM-GW for implementation.

The interface capability is also expanded for the existing network entity in this embodiment, including:

There is an interface (R' interface) between the SMS-AS and the HSS/HLR, configured to support the SMS-AS/NeDs to acquire the MT routing information from the HSS/HLR.

Figure 13:
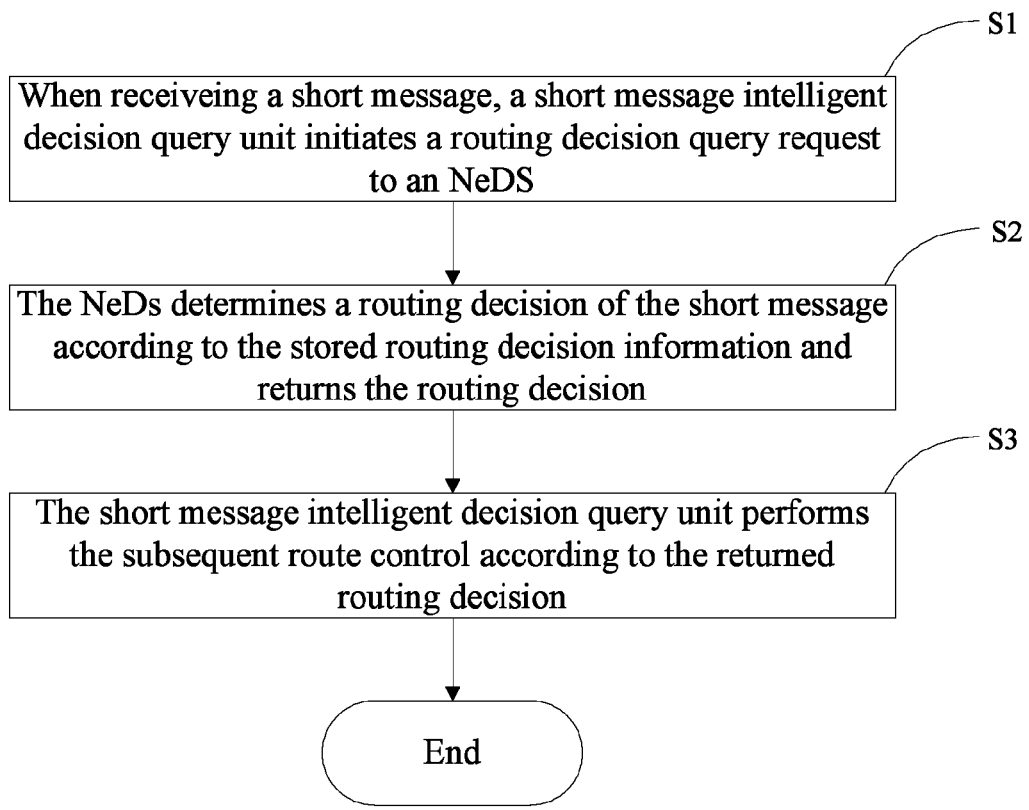
FIG. 13 is a flowchart illustrating a method in accordance with an embodiment.

By applying the above apparatus and system, a method for short message routing control is also provided. The method, as shown in FIG. 13, includes the following:

S1. A short message intelligent decision query unit initiates a routing decision query request to an NeDs upon receiving a short message.

In this process, the short message intelligent decision query unit is located in an MO short message center, an MT short message center, or an HSS/HLR;

S2. The NeDs determines a routing decision of the short message according to the stored routing decision information, and returns the determined routing decision to the short message intelligent decision query unit.

In this process, the routing decision information stored in the NeDs at least includes one of the following: the user's registration state in the CS domain and the IMS, user's preference information, and operator's strategy.

S3. The short message intelligent decision query unit performs the subsequent routing control according to the returned routing decision.

Corresponding to the implementation mode of the above system, three methods for implementing the embodiment are provided as follows.

Implementation method I: A short message intelligent decision query unit is simultaneously located in an MO short message center and an MT short message center.

L11. The short message intelligent decision query unit initiates a routing decision query request to an NeDs upon receiving a short message.

With the short message intelligent decision query unit simultaneously embodied in the MO short message center and MT short message center, in this process, the MO short message center queries the NeDs for inter-domain routing information, and the MT short message center queries the NeDs for the enhanced routing control information in the terminating domain;

L12. The NeDs determines a routing decision of the short message according to the stored routing decision information, and returns the determined routing decision to the short message intelligent decision query unit.

In this process, when the MO short message center queries for the inter-domain routing information, the NeDs returns the address of the terminating domain short message center (the address of the SMSC or the IP-SM-GW/SMS-AS), and, when the MT short message center queries the routing information at the terminating domain, the NeDs returns the enhanced routing control decision.

The enhanced routing control decision includes one of the following: the priority of routes when multiple IP connections in this domain is activated, the strategy for routing the short message to another IP connection after failing to send the short message via an IP connection when multiple IP connections in the domain is activated, and the strategy for selecting another domain to route the short message when failing to send the short message in this domain.

L13. The short message intelligent decision query unit performs the subsequent routing control according to the returned routing decision.

In this process, the subsequent routing control including one of the following processes. Control the MO short message center to directly send the short message to the MT short message center; control the MO IP-SM-GW/SMS-AS to route the short message to the I-CSCF of the called user via the S-CSCF of the calling user; the I-CSCF of the called user queries the HSS/HLR to obtain the address of the S-CSCF of the called user, and routes the short message to the S-CSCF of the called user; the S-CSCF of the called user forwards the short message to the MO IP-SM-GW/SMS-AS; re-forward the short message to another domain upon failing to send the short message in this domain.

Implementation method II, in the case that the short message intelligent decision query unit is embodied in the HSS/HLR, includes the following:

L21. The short message intelligent decision query unit initiates a routing decision query request to the NeDs upon receiving a short message.

In the case that the short message intelligent decision query unit is embodied in the HSS/HLR, in this process, one of the following methods triggers the HSS/HLR to initiate a routing decision query request to the NeDs: the MO short message center initiates an MT routing information query, and the MT short message center initiates an MT routing information query.

L22. The NeDs determines a routing decision of the short message according to the stored routing decision information, and returns the determined routing decision to the short message intelligent decision query unit.

In this process, the MO short message center initiates an MT routing information query to trigger the HSS/HLR to initiate a routing decision query request to the NeDs, and the NeDs returns the address of the terminating domain short message center (the address of the SMSC or IP-SM-GW/SMS-AS); the MT short message center initiates an MT routing information query to trigger the HSS/HLR to initiate a routing decision query request to the NeDs, and the NeDs returns an enhanced routing control decision.

The enhanced routing control decision includes one of the following method: the priority of routes in the case that multiple IP connections in the domain are activated, the strategy for routing the short message to another IP connection upon failing to send a short message via an IP connection in the case that multiple IP connections in the domain are activated, the strategy for routing the short message to another domain upon failing to send the short message in this domain.

L23. The short message intelligent decision query unit performs the subsequent routing control according to the returned routing decision.

In this process, the subsequent routing control includes one of the following processes. Control the MO short message center to directly send a short message to the MT short message center; control the MO IP-SM-GW/SMS-AS to route the short message to the I-CSCF of the called user via the S-CSCF of the calling user; the I-CSCF of the called user queries the HSS/HLR to obtain the address of the S-CSCF of the called user, and routes the short message to the S-CSCF of the called user; the S-CSCF of the called user forwards the short message to the terminating IP-SM-GW/SMS-AS; re-forward the short message to another domain according to the routing decision upon failing to send the short message in this domain.

Implementation method III, in the case that the short message intelligent decision query unit is embodied in the MT short message center, includes the following:

L31. The short message intelligent decision query unit initiates a routing decision query request to the NeDs upon receiving the short message.

When the short message intelligent decision query unit is embodied in the MT short message center, the MT short message center also includes an NeDs, i.e., the MT short message center has a capability of querying for the intelligent routing control information of the called user.

The MT short message center is determined according to one of the following modes: statically configuring the address of the MT short message center on the HSS/HLR, and selecting a nearby MT short message center in the same domain with the MO short message center;

L32. The NeDs determines a routing decision of the short message according to the stored routing decision information, and returns the determined routing decision to the short message intelligent decision query unit.

In this process, the routing decision returned by the NeDs includes one of the following: the address of the MT short message center upon making the routing decision; the priority of routes in the case that multiple IP connections in this domain are activated, the strategy for routing the short message to another IP connection upon failing to send the short message via an IP connection in the case that multiple IP connections in this domain are activated, and the strategy for routing the short message to another domain upon failing to send the short message in this domain.

L33. The short message intelligent decision query unit performs the subsequent routing control according to the returned routing decision.

In this step, the subsequent routing control includes one of the following processes. Control the CS domain short message center to route the short message to the I-CSCF of the called user via the SMS-MGCF; the I-CSCF of the called user queries the HSS/HLR to obtain the address of the S-CSCF of the called user; the S-CSCF of the called user forwards the short message to the SMS-AS/NeDs of the called user; control the IMS short message center to send the short message to the Border Gateway Control Function (BGCF) via the S-CSCF; the BGCF forwards the short message to the SMS-MGCF; the SMS-MGCF routes the short message to the SMSC/NeDs in the CS domain; re-forward the short message to another domain according to the routing decision upon failing to send the short message in this domain.

If the SMS-MGCF and the SMS-AS/NeDs are both added to the IP-SM-GW for implementation, the NeDs on the IP-SM-GW makes a decision after the short message from the CS domain reaches the IP-SM-GW. If the routing decision is to route the short message to the IMS, the short message is directly routed to the S-CSCF for the subsequent processing.

Seven embodiments corresponding to the implementation method I are described as follows.

Figure 14:
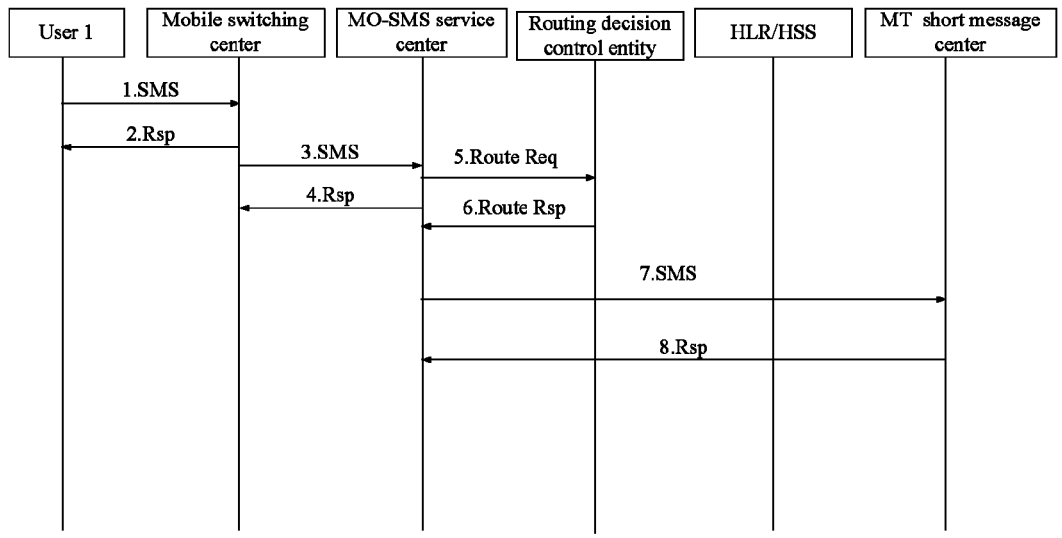
FIG. 14 is a flowchart of signaling in accordance with method embodiment 1.1.

Method embodiment 1.1: A short message in the CS domain is sent to a user subscribing to both CS domain and IMS, a procedure at the MO as shown in FIG. 14 includes the following:

At 1-2, UE1 sends a short message to an MSC, and the MSC returns a response to UE1.

At 3-4, the MSC sends a message to an MO-SMSC, and the MO-SMSC returns a response to the MSC.

At 5-6, the MO-SMSC sends a request message to HSS/HLR for the routing information of the MT short message center; the request message is intercepted by an NeDs; the NeDs makes a decision to determine the domain to which the short message is to be routed, and returns the address of the MT short message center (the address may be the address of the MT short message center in the CS domain, or the address of the IP-SM-GW/SMS-AS in the IMS).

At 7-8, the MO-SMSC sends the short message to the MT short message center, and the MT short message center returns a response to the MO-SMSC.

Figure 15:
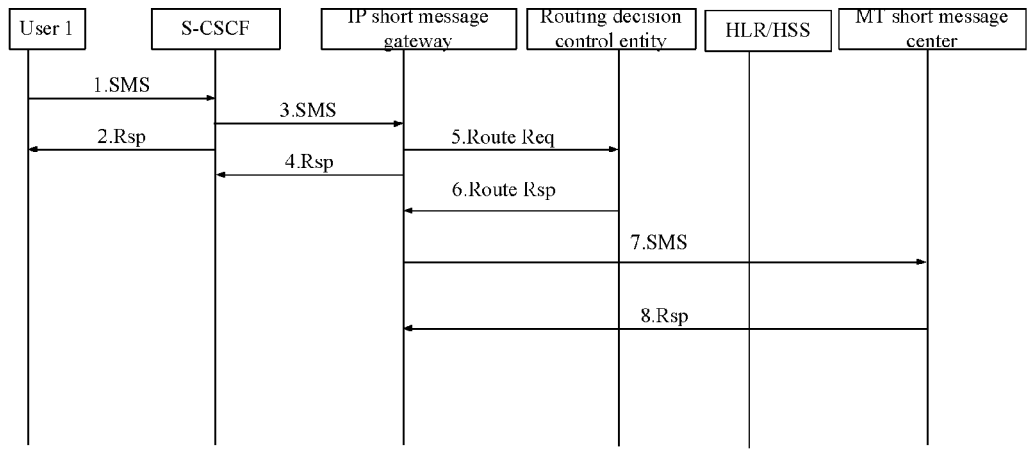
FIG. 15 is a flowchart of signaling in accordance with method embodiment 1.2.

Method embodiment 1.2: The IMS sends a short message to a user subscribing to both CS domain and IMS, and the first procedure at MO as shown in FIG. 15 includes the following:

At 1-2, UE1 sends a short message to an S-CSCF, and the S-CSCF returns a response to UE1.

At 3-4, the S-CSCF sends the short message to an IP-SM-GW/SMS-AS, the IP-SM-GW/SMS-AS returns a response to the S-CSCF.

At 5-6, the IP-SM-GW/SMS-AS sends a request message to an HSS/HLR for the routing information of the MT short message center, and the request message is intercepted by an NeDs, the NeDs makes a decision to route the short message to the IMS, and returns the address of the terminating short message center (if the CS domain is selected, the address of the SMSC in the CS domain is returned; if the IMS is selected, the address of the IP-SM-GW/SMS-AS is returned).

At 7-8, the IP-SM-GW/SMS-AS sends the short message to the MT short message center, and the MT short message center returns a response.

Figure 16:
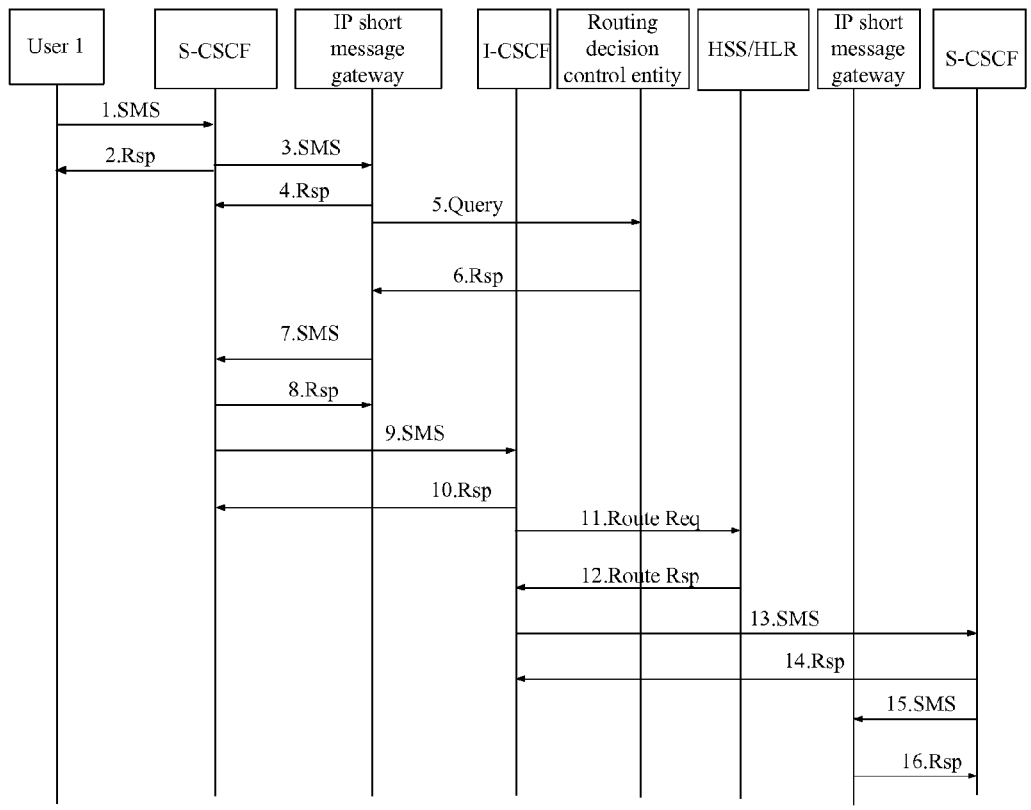
FIG. 16 is a flowchart of signaling in accordance with method embodiment 1.3.

Method embodiment 1.3: A short message in the IMS is sent to a user subscribing to both CS domain and IMS, and the second procedure at the MO as shown in FIG. 16 includes the following:

At 1-2, UE1 sends a short message to an S-CSCF, and the S-CSCF returns a response to UE1.

AT 3-4, the S-CSCF sends a message to an MO IP-SM-GW/SMS-AS, and the MO IP-SM-GW/SMS-AS returns a response to the S-CSCF.

At 5-6, the MO IP-SM-GW/SMS-AS sends a request message to the HSS/HLR for the routing information of the MT short message center, the request message is intercepted by an NeDs, and the NeDs makes a decision to route the short message to the IMS and returns a response.

At 7-8, the MO IP-SM-GW/SMS-AS resends the short message to the S-CSCF of the calling user;

At 9-10, the S-CSCF of the calling user finds the I-CSCF of the called user according to the DNS parsing of the called user, and sends the short message to the I-CSCF. The I-CSCF returns a response.

At 11-12, the I-CSCF queries the HSS/HLR for the routing information, and the HSS/HLR returns the address of the S-CSCF of the called user.

At 13-14, the I-CSCF sends the short message to the S-CSCF of the called user, and the S-CSCF of the called user returns a response.

At 15-16, the S-CSCF of the called user triggers the short message to an MT IP-SM-GW/SMS-AS according to the iFC.

Figure 17:
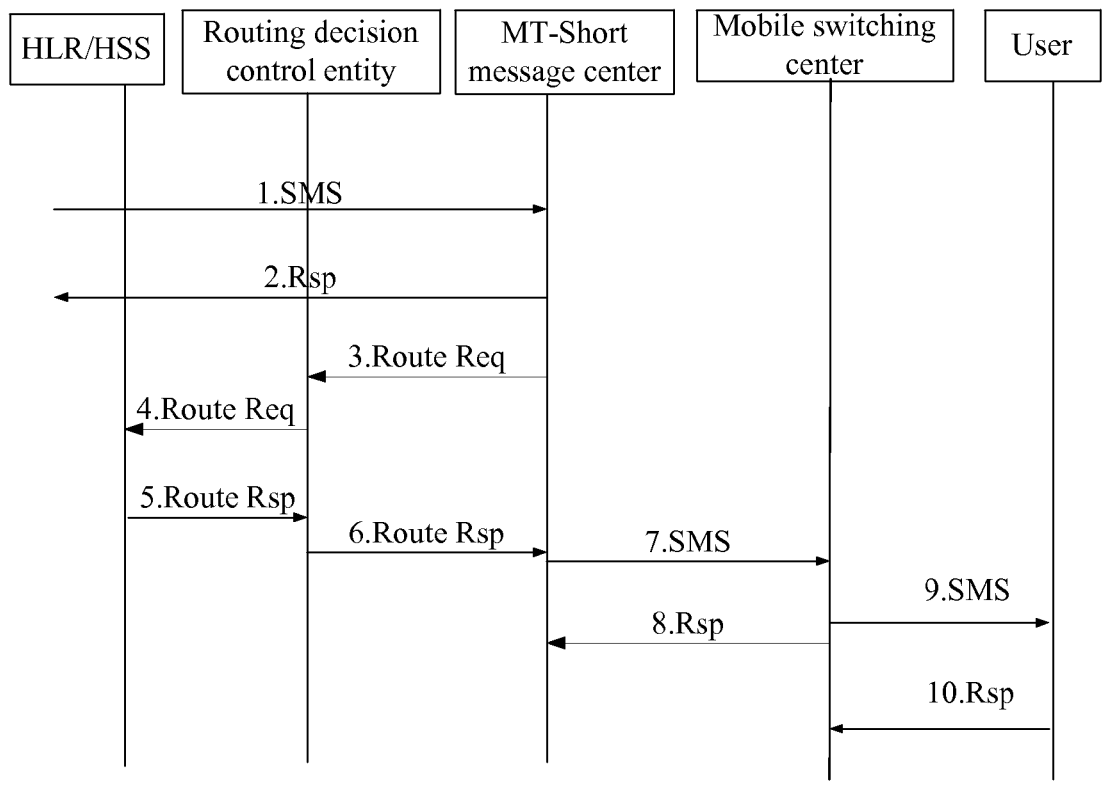
FIG. 17 is a flowchart of signaling in accordance with method embodiment 1.4.

Method embodiment 1.4: for the procedure that the short message sent to a user subscribing to both CS domain and IMS terminates in the CS domain, see FIG. 17, the process includes the following:

At 1-2, the MT short message center in the CS domain receives a short message. For the procedure at the MO, see embodiments 1.1 and 1.2.

At 3-4, the MT-SMSC sends a request message to the HSS/HLR for the routing information of the called user, and the request message is intercepted by the NeDs. When the NeDs determines that the request message is for obtaining the routing information of the called user, and forwards the request message to the HSS/HLR.

At 5-6, the HSS/HLR returns the routing information of the called user in the CS domain, the routing information including the address of the MSC; the NeDs returns the address of the MSC to the MT-SMSC according to the decision upon intercepting a routing response.

At 7-8, the MT-SMSC sends the short message to the MSC of the called user, and the MSC of the called user returns a response to the MT-SMSC.

At 9-10, the MSC sends the short message to the UE, and the UE returns a response.

Figure 18:
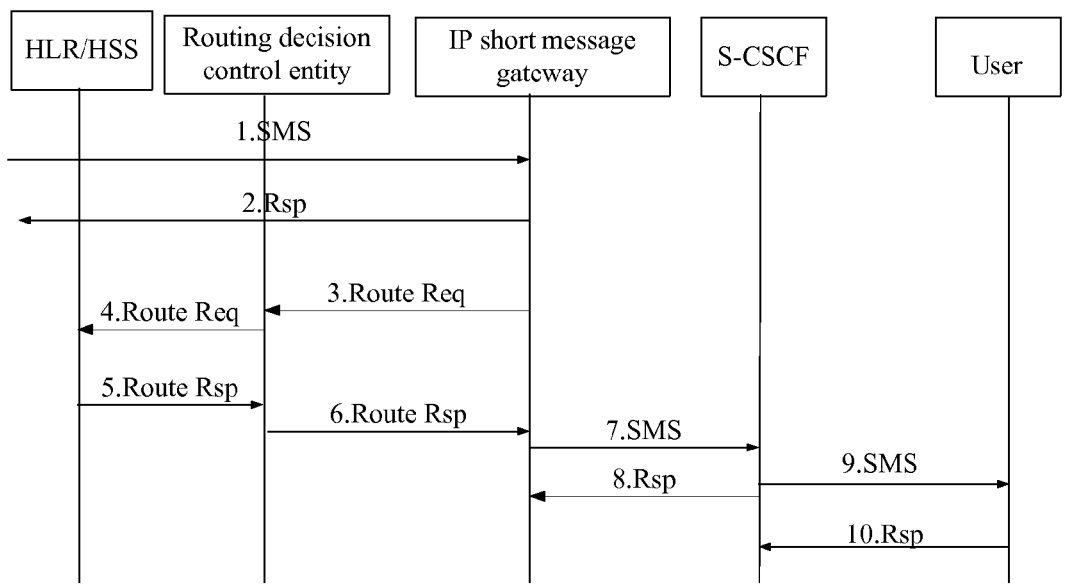
FIG. 18 is a flowchart of signaling in accordance with method embodiment 1.5.

Method embodiment 1.5: For the procedure at the MT that the short message sent to a user subscribing to both CS domain and IMS terminates in the IMS, see FIG. 18, and the procedure includes the following:

At 1-2, the MT short message center IP-SM-GW/SMS-AS in the IMS receives a short message. For a procedure at MO, see embodiments 1.1, 1.2 and 1.3.

At 3-4, the IP-SM-GW/SMS-AS sends a request message to the HSS/HLR for the routing information in the IMS, and the request message is intercepted by an NeDs. The NeDs determines that request message is for obtaining the routing information of the called user, and forwards the request message to the HSS/HLR.

At 5-8, the HSS/HLR returns the routing information of the called user in the IMS; the NeDs selects an IP connection according to the routing information of the called user in the IMS upon intercepting the response, and the IP-SM-GW/SMS-AS directly sends the short message to the S-CSCF of the called user according to the routing strategy and the third party registration information when the called user registers; the S-CSCF returns a response to the IP-SM-GW/SMS-AS.

At 9-10, the S-CSCF sends the short message to the UE; the UE returns a response.

Figure 19:
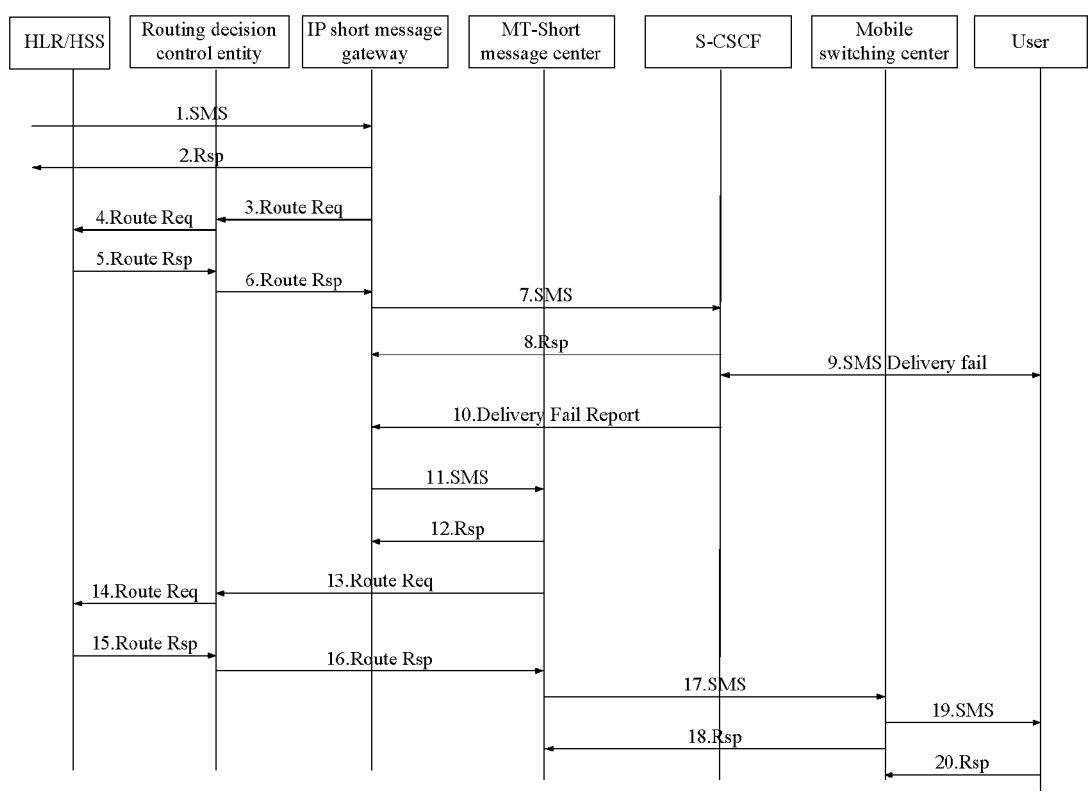
FIG. 19 is a flowchart of signaling in accordance with method embodiment 1.6.

Method embodiment 1.6: For a procedure that the short message sent to a user subscribing to both CS domain and IMS terminating in the CS domain upon failing to route the short message to the IMS, see FIG. 19, and the procedure includes the following:

At 1-2, an IP-SM-GW/SMS-AS in the IMS receives a short message from the MO. For a procedure at the MO procedure, see embodiments 1.1, 1.2 and 1.3.

At 3-4, the IP-SM-GW/SMS-AS sends a request message to the HSS/HLR for the routing information in the IMS. The request message is intercepted by an NeDs. The NeDs determines that request message is to obtain the routing information of the called user, and forwards the request message to the HSS/HLR.

At 5-6, the HSS/HLR returns the routing information of the called user in the IMS. After intercepting the routing response, the NeDs returns the routing strategy of the called user. The routing strategy includes: the routing information in the IMS, whether to address another domain upon failing to send the short message in the IMS, and the address of the MT SMSC, etc. In this embodiment, the NeDs makes a decision that it is necessary to continue to route the short message to the CS domain, and returns the address of an MT-SMSC.

At 7-8, the IP-SM-GW/SMS-AS forwards the short message to the S-CSCF according to the routing strategy and the information stored when the user registers in the IMS.

At 9, the S-CSCF fails to deliver the short message to the UE2.

At 10, the S-CSCF returns a short message delivery failure report to the IP-SM-GW/SMS-AS.

At 11-12, the IP-SM-GW/SMS-AS forwards the short message to the MT-SMSC according to the inter-domain routing information obtained in 3-6, and deletes the short message stored locally;

At 13-16, the MT-SMSC queries the HSS/HLR for the routing information of the called user, and the HSS/HLR returns the MSC address of the called user.

At 17-18, the MT-SMSC sends the short message to the MSC of the called user, and the MSC of the called user returns a response to the MT-SMSC.

At 19-20, the MSC sends a short message to the UE, and the UE returns a response.

Figure 20:
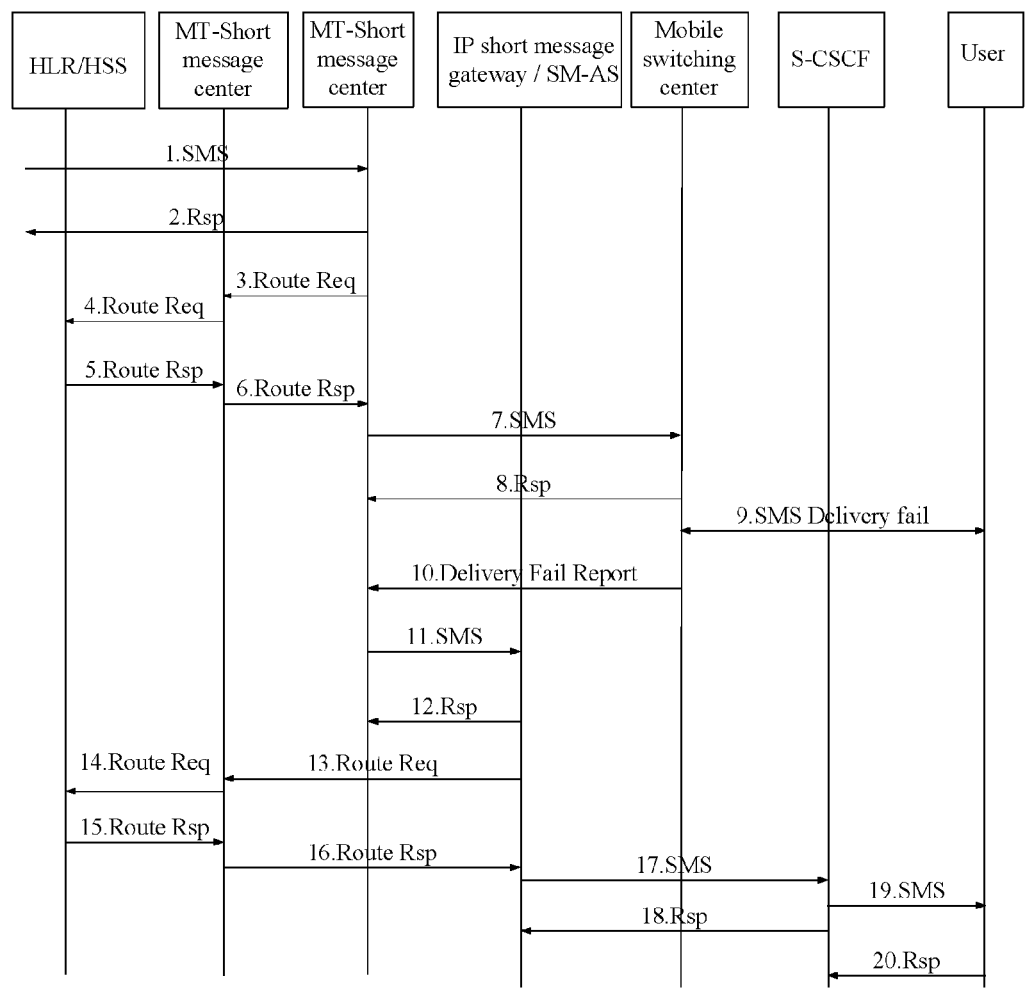
FIG. 20 is a flowchart of signaling in accordance with method embodiment 1.7.

Method embodiment 1.7: For a procedure that the short message sent to a user subscribing to both CS domain and IMS terminates in the CS domain after the short message fails to be routed to the CS domain, see FIG. 20, and the process includes the following:

At 1-2, the MT-SMSC receives the short message. For a procedure at the MO, see embodiments 1.1 and 1.2);

At 3-4, the MT-SMSC sends a request message to the HSS/HLR for the routing control information of the called user in the CS domain. The request message is intercepted by an NeDs. The NeDs determines that the request message if for obtaining the routing information of the called user, and forwards the request message to the HSS/HLR.

At 5-6, the HSS/HLR returns the routing information of the called user in the CS domain. After intercepting the routing response signaling, the NeDs returns the routing strategy of the called user, which includes the address of the MSC of the called user returned by the HSS/HLR and the routing control information of the called user after the NeDs makes a decision. The routing control information includes whether to continue to address another domain, and whether to terminate this procedure of the short message, etc. In this embodiment, the NeDs returns a decision that it is necessary to continue to route the short message to the IMS. The decision returned by the NeDs contains the E.164 address of the IP-SM-GW/SMS-AS.

At 7-8, the MT-SMSC sends the short message to the MSC of the called user, and the MSC of the called user returns a response to the MT-SMSC.

At 9, the MSC fails to deliver a short message to the UE.

At 10, the MSC returns a short message delivery failure report to the MT-SMSC.

At 11-12, the MT-SMSC forwards the short message to the IP-SM-GW/SMS-AS, and deletes the short message stored locally.

At 13-16, the IP-SM-GW/SMS-AS queries the HSS/HLR for the routing decision information in the IMS to get the routing information in the IMS.

At 17-18, the IP-SM-GW/SMS-AS forwards the short message to the S-CSCF according to the information stored by the user when the user registers; and At 19-20, the S-CSCF sends the short message to the UE, and the UE returns a response.

One method embodiment corresponding to the implementation method II is described as follows. The deference from the above seven method embodiments corresponding to implementation method I lies in that, when the calling/called user short message center obtains intelligent routing information, the short message is first sent to the HSS/HLR, and the HSS/HLR determines that the user subscribes to both CS domain and IMS, and initiates an intelligent routing information query to the NeDs.

Figure 21:
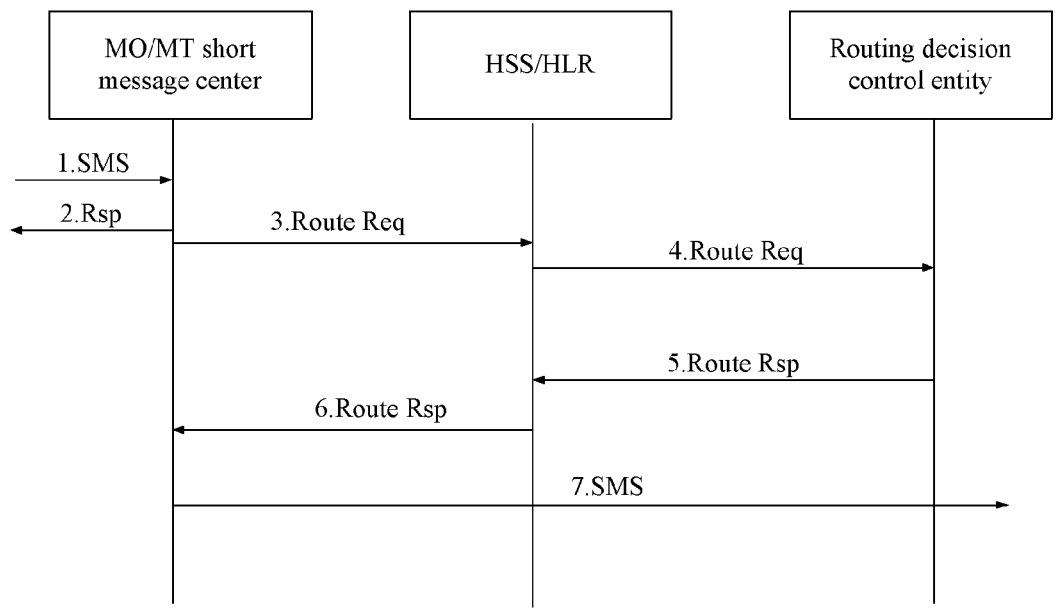
FIG. 21 is a flowchart of signaling in accordance with method embodiment 2.1.

Method embodiment 2.1 as shown in FIG. 21 includes the following:

At 1-2, the MO/MT short message center in the IMS or the CS domain receives a short message.

At 3, the MO/MT short message center initiates a process of querying the HSS/HLR to obtain the routing information of the called user.

At 4, the HSS/HLR determines that the called user subscribes to both CS domain and IMS, and initiates a process of querying the NeDs for the intelligent routing control information.

At 5, the NeDs returns the intelligent routing control information.

At 6, the HSS/HLR returns the intelligent routing control information to the MO/MT short message center.

At 7, the MO/MT short message center controls the subsequent route according to the obtained intelligent routing control information.

Seven method embodiments corresponding to the implementation method III are described as follows.

Method embodiment 3.1. For a procedure that a short message in the CS domain sent to a double subscription user is routed to the MT short message center in the CS domain, see the procedure for sending a short message to the user having a single subscription in the CS domain in the prior art II.

Figure 22:
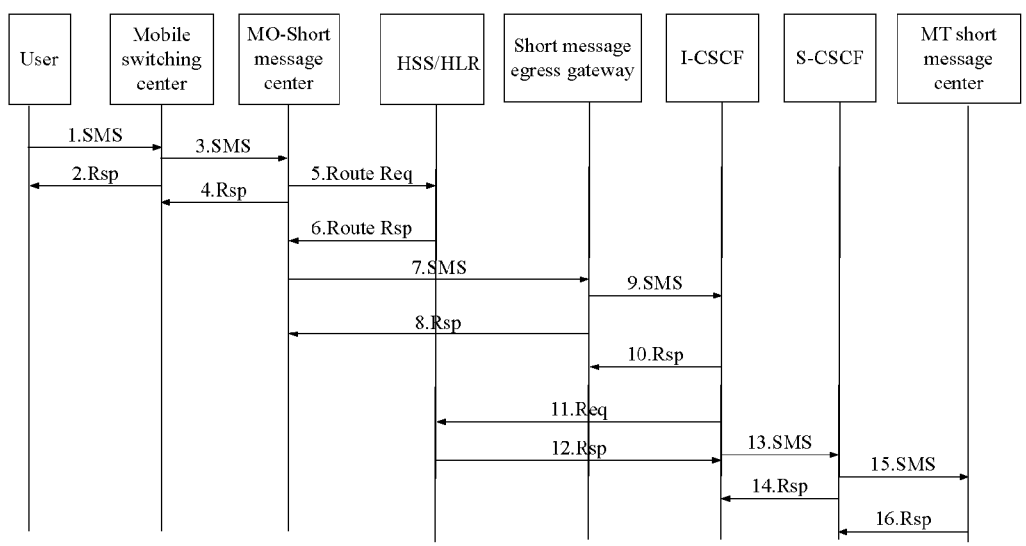
FIG. 22 is a flowchart of signaling in accordance with method embodiment 3.2.

Method embodiment 3.2: For a procedure that a short message in the CS domain sent to a user subscribing to both CS domain and IMS is routed to the MT short message center in the IMS, see FIG. 22. The procedure includes the following:

At 1-2, UE1 sends a short message to an MSC, and the MSC returns a response to UE1.

At 3-4, the MSC sends the short message to an MO-SMSC, and the MO-SMSC returns a response to the MSC.

At 5-6, the MO MO-SMSC queries the HSS/HLR for the routing information, the HSS/HLR returns the address of the MT short message center in the CS domain or the address of the SMS-MGCF of the IMS according to the static configuration or the type of originating domain.

At 7-8:A, if the MT short message center is in the CS domain, the MO-SMSC directly sends a short message to the MT-SMSC, and the MT-SMSC returns a response to the MO-SMSCS without performing 9-16; at B, if the MT short message center is in the IMS, the MO-SMSC sends a short message to the SMS-MGCF.

At 9-10, the SMS-MGCF makes an ENUM query according to the TelUrl address of the called user, and sends the short message to the I-CSCF. The I-CSCF returns a response.

At 11-12, the I-CSCF queries the HSS/HLR to obtain the S-CSCF of the called user.

At 13-14, the I-CSCF sends the short message to the S-CSCF of the called user.

At 15-16, the S-CSCF forwards the short message to the MT short message center according to a triggering rule.

Figure 23:
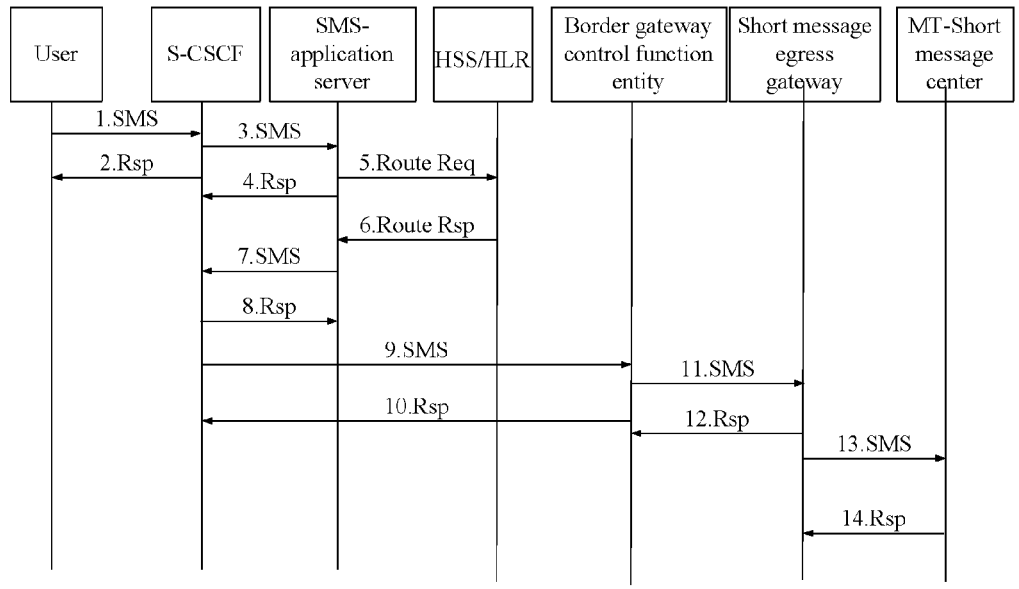
FIG. 23 is a flowchart of signaling in accordance with method embodiment 3.3.

Method embodiment 3.3. For a procedure that the IMS short message sent to a user subscribing to both CS domain and IMS is routed to the MT short message center in the CS domain, see FIG. 23. The procedure includes the following:

At 1-2, the UE sends a short message to an S-CSCF, and the S-CSCF returns a response to the UE.

At 3-4, the S-CSCF triggers the short message to the SMS-AS according to a triggering rule.

At 5-6, the SMS-AS queries the HSS/HLR for the routing information, and the HSS/HLR, according to the static configuration or the type of the originating domain, returns the address of the MT short message center, e.g., in this embodiment, returns the address of the short message center in the CS domain.

At 7-8, the SMS-AS takes the address of the short message center as the destination address and writes the address in the short message, and re-routes the short message to the S-CSCF. It is required to ensure that the original address information of the called user is not lost.

At 9-10, the S-CSCF determines that the short message is destined to the CS domain upon failing to find SipUrl according to the TelUrl of the address of the CS domain short message center in the destination address, and forwards the short message to the BGCF.

At 11-12, the BGCF forwards the short message to the SMS-MGCF.

At 13-14, the SMS-MGCF sends the short message to the MT-SMSC according to the address of the short message center. The original address of the called user needs to be written in the destination address of the short message so that the short message center may route the short message.

Figure 24:
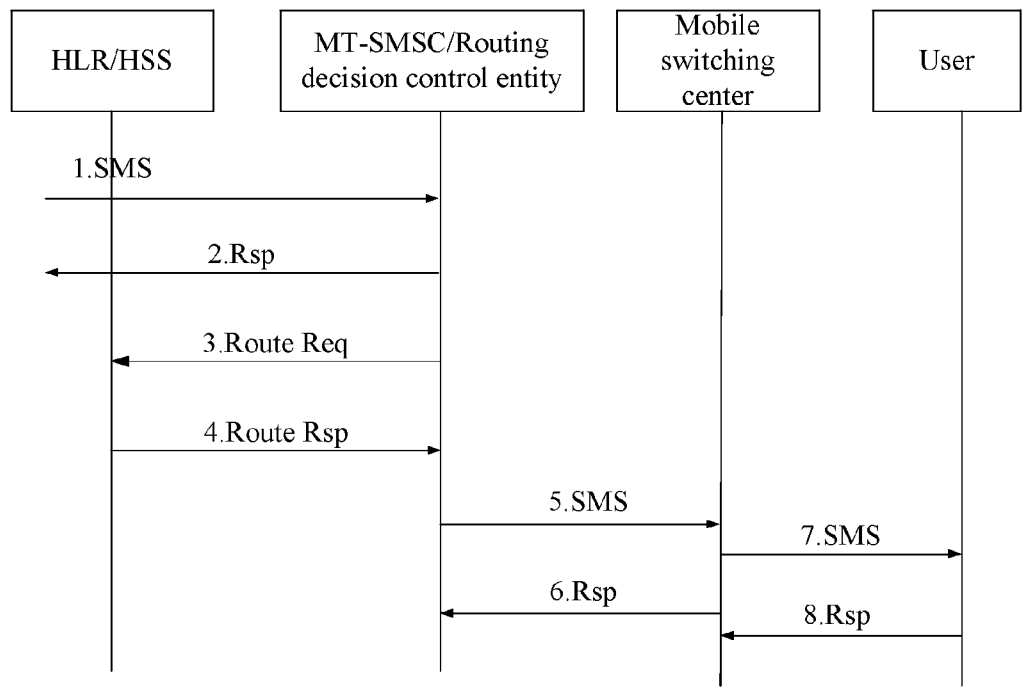
FIG. 24 is a flowchart of signaling in accordance with method embodiment 3.4.

Method embodiment 3.4. For a procedure that the short message terminates in the CS domain under the control of the CS domain MT short message center, see FIG. 24. The procedure includes the following:

At 1-2, the MT-SMSC/NeDs receives a short message from the MO.

At 3-4, the NeDs function of the MT-SMSC makes a decision that the short message needs to be routed to the CS domain, and queries the HSS/HLR for the routing information of the called user. The HSS/HLR returns the address of the MSC of the called user.

At 5-6, the MT-SMSC sends the short message to the MSC of the called user, and the MSC of the called user returns a response to the MT-SMSC.

At 7-8, the MSC sends the short message to the UE, and the UE returns a response.

Figure 25:
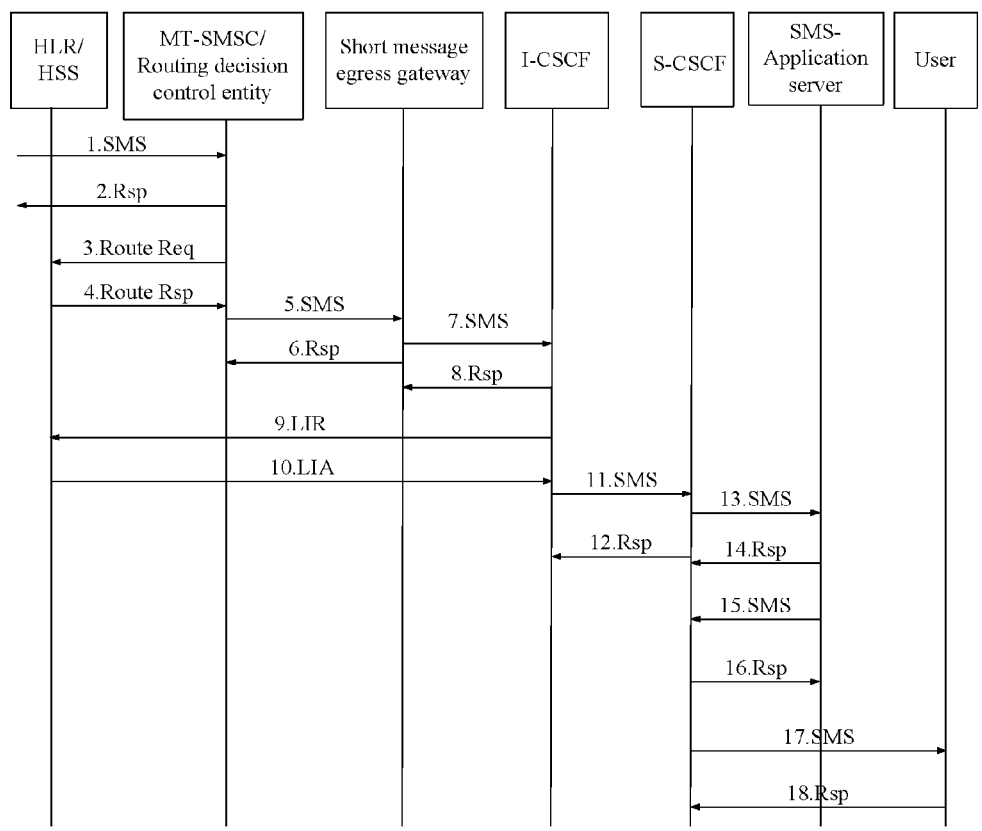
FIG. 25 is a flowchart of signaling in accordance with method embodiment 3.5.

Method embodiment 3.5: For a procedure for terminating in the IMS under the control of the MT short message center in the CS domain, see FIG. 25. The procedure includes the following:

At 1-2, the MT-SMSC/NeDs receives a short message from the MO.

At 3-4, the NeDs function of the MT-SMSC makes a decision that the short message needs to be routed to the IMS, and queries the HSS/HLR for the address of the SMS-MGCF.

At 5-6, the MT-SMSC/NeDs sends the short message to the SMS-MGCF.

At 7-8, the SMS-MGCF sends the short message to the I-CSCF, and the I-CSCF returns a response to the SMS-MGCF.

At 9-10, the I-CSCF queries the HSS/HLR for the address of the S-CSCF.

At 11-12, the I-CSCF routes the short message to the S-CSCF.

At 13-14, the S-CSCF routes the short message to the SMS-AS according to a triggering rule.

At 15-16, the SMS-AS routes the short message back to the S-CSCF.

At 17-18, the S-CSCF sends the short message to the UE, and the UE returns a response.

Figure 26:
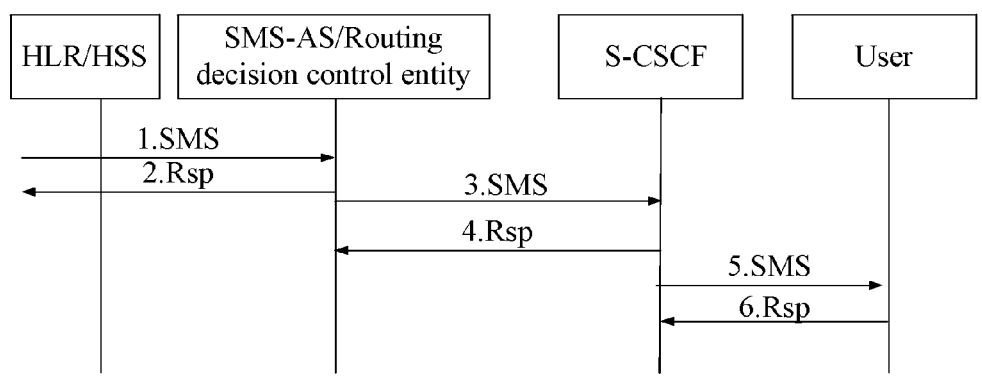
FIG. 26 is a flowchart of signaling in accordance with method embodiment 3.6.

Method embodiment 3.6: For a procedure for terminating in the IMS under the control of the MT short message center in the IMS, see FIG. 26. The procedure includes the following:

At 1-2, the SMS-AS/NeDs receives a short message from the CS domain or the IMS.

At 3-4, the NeDs of the SMS-AS makes a decision to route the short message to the IMS, and directly sends the short message to the S-CSCF of the called user; the S-CSCF returns a response.

At 5-6, the S-CSCF sends the short message to the UE; the UE returns a response.

Figure 27:
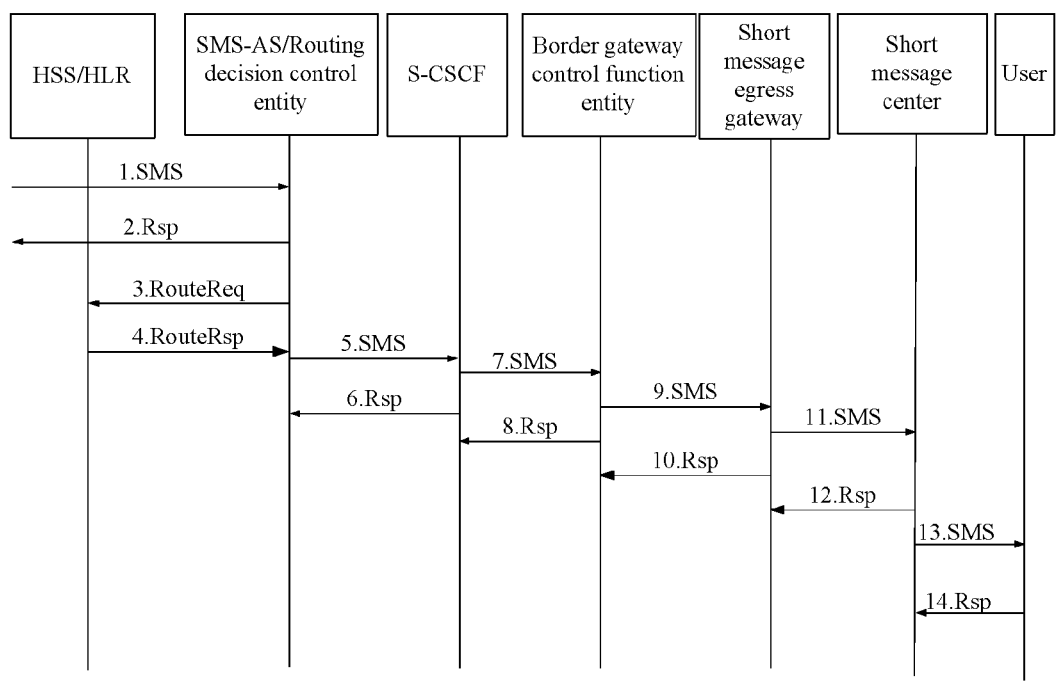
FIG. 27 is a flowchart of signaling in accordance with method embodiment 3.7.

Method embodiment 3.7: For a procedure for terminating in the CS domain under the control of the CS domain MT short message center, see FIG. 27. The procedure includes the following:

At 1-2, the SMS-AS/NeDs receives the short message from the MO via the S-CSCF.

At 3-4, the NeDs of the MT-SMSC makes a decision to route the short message to the CS domain, and queries the HSS/HLR for the address of the SMSC at the MT.

At 5-6, SMS-AS fills the address of the SMSC in the destination address, and sends the short message back to the S-CSCF. The original address information of the called user needs to be stored in the short message.

At 7-8, the S-CSCF determines that the short message is destined to the CS domain upon failing to find the SipUrl according to the TelUrl of the CS domain short message center address in the destination address, and routes the short message to the BGCF; the BGCF returns a response.

At 9-10, the BGCF routes the short message to the SMS-MGCF.

At 11-12, the SMS-MGCF routes the short message to the short message center in the CS domain according to the address of the short message center; the original address of the called user needs to be written in the destination address of the message so that the short message center may route the short message.

At 13-14, the short message center in the CS domain sends the short message to the UE according to the normal route.

To sum up, in the embodiment, entities such as NeDs, short message intelligent decision query unit and MT (called side) short message center are introduced to the existing network architecture, which not only enhances the control on the MT but also solves the problem of routing and addressing in the case that the short message is interworked between the CS domain and IMS in each scenario.

Further, the embodiments provide a single subscription user with the enhanced routing control function of the short message; the embodiments also solve the problem of the routing and addressing of short message of the user subscribing to both CS domain and IMS, and provide the enhanced routing control function of the short message. The embodiment allows a more reasonable path to be selected for routing the short message between the IMS and CS domain according to available information, thus improving user's experience and QoS.

Obviously, those skilled in the art may make numerous changes and variations on the solution of the present disclosure without departing from the essential and scope thereof. Accordingly, it is intended that the present disclosure includes the changes and variations in case that such changes and variations come within the scope as set forth in the appended claims and the equivalent techniques thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. In a short messaging communication system where multiple paths exist for routing a plurality of short messages, an apparatus for short message routing control and routing decision processing, the apparatus comprising:
  a memory unit for storing routing decision information used in determining one or more routing decisions for one or more short messages; and
  a routing decision control entity coupled to the memory unit and configured to retrieve the stored routing decision information or use in determining the routing decision of the one or more short messages by first determining when multiple IP connections in an IP multimedia subsystem (IMS) domain are activated,
  wherein when multiple IP connections in the IMS domain are activated:
  determining a priority of routes within the IMS domain, and
  a policy for selecting another of the multiple IP connections upon failing to send the one or more short messages via a first IP connection from the multiple IP connections,
  otherwise, routing the one or more short messages to a circuit switched (CS) domain upon failing to send the one or more short messages in the IMS domain.

2. The apparatus of claim 1, wherein, the routing decision of the short message determined by the routing decision control apparatus is based on routing decision information comprising registration state of user equipment, operator's strategy, or user's preference.

3. A system for short message routing control capable of delivering a plurality of short messages when multiple routing paths exist, the system comprising:
  a short message intelligent decision query unit, configured to query for a routing decision of a short message and perform subsequent routing control according to the returned routing decision; and
  a routing decision control entity, configured to determine the routing decision of the short message according to routing decision information stored in the routing decision control entity by first determining if multiple IP connections in an IP multimedia subsystem (IMS) domain are activated upon receiving a query from the short message intelligent decision query unit,
  wherein when multiple IP connections in the IMS domain are activated,
  determining a priority of routes within the IMS domain, and
  a policy for selecting another of the multiple IP connections upon failing to send the one or more short messages via a first IP connection from the multiple IP connections,
  otherwise, routing the one or more short messages to a circuit switched (CS) domain upon failing to send the one or more short messages in the IMS domain.

4. The system of claim 3, further comprising: a home subscriber server, which is connected to, and communicates with, other network entities via the routing decision control entity;
  a mobile originating short message center, which includes an originating short message intelligent decision query unit configured to query for an inter-domain routing decision to enable the mobile originating short message center to route the short message to a selected domain; and
  a mobile terminated short message center, which includes the short message intelligent decision query unit.

5. The system of claim 4, wherein the mobile originating short message center, the mobile terminated short message center, or both, is a short message service center in the circuit switched domain, an interworking gateway to which an short message service application system unit is added in the IP multimedia subsystem, or both.

6. The system of claim 5, wherein a short message system gateway connects the routing decision control entity with the mobile originating short message center.

7. The system of claim 5, wherein the interworking gateway is an IP short message gateway.

8. The system of claim 3, further comprising: a home subscriber server, which includes the short message intelligent decision query unit and is configured to query the routing decision control entity for the routing decision when a mobile originating short message center, a mobile terminated short message center, or both, acquires mobile terminated routing information; and wherein the routing decision control entity is connected to, and communicates with other network entities via, the home subscriber server.

9. The system of claim 8, wherein the mobile originating short message center, the mobile terminated short message center, or both, is a short message service center in a circuit switched domain, an interworking gateway to which short message service application system unit is added in the IP multimedia subsystem, or both.

10. The system of claim 9, wherein upon receiving a short message routing query message, the home subscriber server is configure to:
  request a routing decision from the routing decision control entity upon determining that a called user subscribes to two domains, select mobile terminated routing information from the stored address information of the mobile terminated short message center according to the routing decision returned by the routing decision control entity, and return the mobile terminated routing information;
  directly return the mobile terminated routing information upon determining that the called user subscribes a single domain; or
  directly forward the short message routing query message to the routing decision control entity, request the routing decision which is then returned by the routing decision control entity after the routing decision control entity determines the registration state of the called user, select the mobile terminated routing information from the stored address information of the mobile terminated short message center according to the routing decision returned by the routing decision control entity, and return the mobile terminated routing information.

11. The system of claim 3, further comprising: a mobile terminated short message center, wherein the short message intelligent decision query unit and the routing decision control entity are both implemented in the mobile terminated short message center.

12. The system of claim 11, further comprising: a home subscriber server, wherein the mobile terminated short message center is a short message service center in the circuit switched domain or an IP short message gateway in the IP multimedia subsystem that acquires the mobile terminated routing information from the home subscriber server.

13. The system of claim 12, wherein the home subscriber server selects the mobile terminated short message center according to a configuration upon receiving the short message routing query message sent from the mobile originating; and wherein the routing decision control entity implemented in the selected mobile terminated short message center makes the routing decision and instructs the home subscriber server to return the mobile terminated routing information according to the made routing decision; otherwise, the routing decision control entity directly routes the short message according to the routing information stored in the mobile terminated short message center.

14. The system of claim 3, wherein, the routing decision of the short message determined by the routing decision control entity is based on routing decision information stored in the routing decision control entity comprising registration state of user equipment, operator's strategy, or user's preference.

15. In a short message intelligent decision query unit, a method for routing control for short messages when multiple routing paths exist, the method comprising:
  initiating a routing decision query request to be sent to a routing decision control entity;
  receiving a routing decision of a short message determined by the routing decision control entity according to stored routing decision information, wherein the routing decision is determined by first determining if multiple IP connections in an IP multimedia subsystem (IMS) domain are activated; and
  processing routing control of the short message according to the routing decision received;
  wherein when multiple IP connections in the IMS domain are activated,
  determining a priority of routes within the IMS domain, and
  a policy for selecting another of the multiple IP connections upon failing to send the one or more short messages via a first IP connection from the multiple IP connections,
  otherwise, routing the one or more short messages to a circuit switched (CS) domain upon failing to send the one or more short messages in the IMS domain.

16. The method of claim 15, wherein the short message intelligent decision query unit is embodied in a mobile terminated short message center.

17. The method of claim 15, wherein the short message intelligent decision query unit is embodied in the home subscriber server, and is configured to query the routing decision control entity for the routing decision when a mobile originating short message center, a mobile terminated short message center, or both, acquires mobile terminated routing.

18. The method of claim 15, wherein the short message intelligent decision query unit and the routing decision control entity are implemented in a mobile terminated short message center.

19. The method of claim 18, wherein the mobile terminated short message center is determined by configuring statically the address of the mobile terminated short message center on a home subscriber server or by selecting a nearby mobile terminated short message center in the same domain with a mobile originating short message center.

20. The method of claim 15, wherein, the routing decision of the short message determined by the routing decision control entity is based on routing decision information stored in the routing decision control entity comprising registration state of user equipment, operator's strategy, or user's preference.

21. The method of claim 15, wherein the routing decision control entity is a Network Domain selection entity (NeDs).

* * * * *